(12) United States Patent
Babanova et al.

(10) Patent No.: US 10,050,296 B2
(45) Date of Patent: Aug. 14, 2018

(54) HIGHLY EFFICIENT ENZYMATIC BIOANODES AND BIOCATHODES

(71) Applicants: Sofiya Malinova Babanova, Albuquerque, NM (US); Plamen B Atanassov, Santa Fe, NM (US)

(72) Inventors: Sofiya Malinova Babanova, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 384 days.

(21) Appl. No.: 14/760,275

(22) PCT Filed: Jan. 13, 2014

(86) PCT No.: PCT/US2014/011277
§ 371 (c)(1),
(2) Date: Jul. 10, 2015

(87) PCT Pub. No.: WO2014/110498
PCT Pub. Date: Jul. 17, 2014

(65) Prior Publication Data
US 2015/0364784 A1    Dec. 17, 2015

Related U.S. Application Data

(60) Provisional application No. 61/751,368, filed on Jan. 11, 2013, provisional application No. 61/913,014, filed on Dec. 6, 2013.

(51) Int. Cl.
*H01M 4/90* (2006.01)
*H01M 8/16* (2006.01)

(52) U.S. Cl.
CPC .............. *H01M 8/16* (2013.01); *H01M 4/90* (2013.01); *H01M 4/9008* (2013.01); *Y02E 60/527* (2013.01)

(58) Field of Classification Search
None
See application file for complete search history.

(56) References Cited

U.S. PATENT DOCUMENTS

| 8,642,308 | B1 * | 2/2014 | Atanassov | C12N 9/0006 435/181 |
| 2005/0095466 | A1 * | 5/2005 | Minteer | B82Y 30/00 429/401 |
| 2007/0287034 | A1 * | 12/2007 | Minteer | H01M 4/8605 429/2 |
| 2008/0118782 | A1 | 5/2008 | Heller | |
| 2008/0248354 | A1 * | 10/2008 | Kubo | C12Q 1/004 429/458 |
| 2010/0040910 | A1 | 2/2010 | Kajino | |
| 2010/0261072 | A1 | 10/2010 | Tsugawa | |
| 2011/0250511 | A1 | 10/2011 | Samukawa | |

OTHER PUBLICATIONS

Bhattacharyya, S. et al. "Photovoltaic Properties of Dye Functionalized Single-Wall Carbon Nanotube/Conjugated Polymer Devices." Chemistry of Materials, vol. 16, No. 23, 2004, pp. 4819-4823. American Chemical Society (ACS), doi:10.1021/cm0496063.*
Yu et al., Enzymatic Biofuel Cells-Fabrication of Enzyme Electrodes Energies, 2010, vol. 3, No. 1, pp. 23-42.

* cited by examiner

*Primary Examiner* — Maria Laios
*Assistant Examiner* — Robert S Carrico
(74) *Attorney, Agent, or Firm* — Gonzales Patent Services; Ellen M. Gonzales

(57) ABSTRACT

A biofuel cell comprising an anode and cathode wherein biocatalytic enzymes are purposefully oriented at each side of the fuel cell so as to increase and/or optimize the enzymes' performance in catalysis and/or electron transfer.

19 Claims, 19 Drawing Sheets

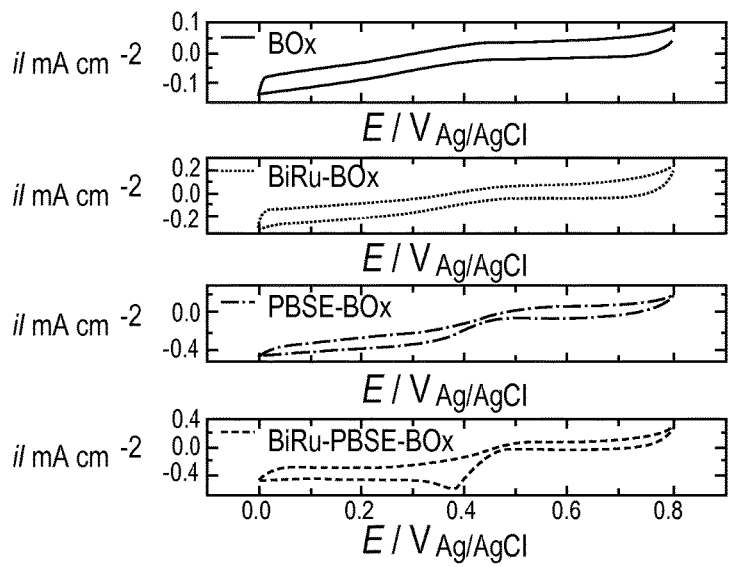
FIG. 28A
FIG. 28B
FIG. 28C
FIG. 28D
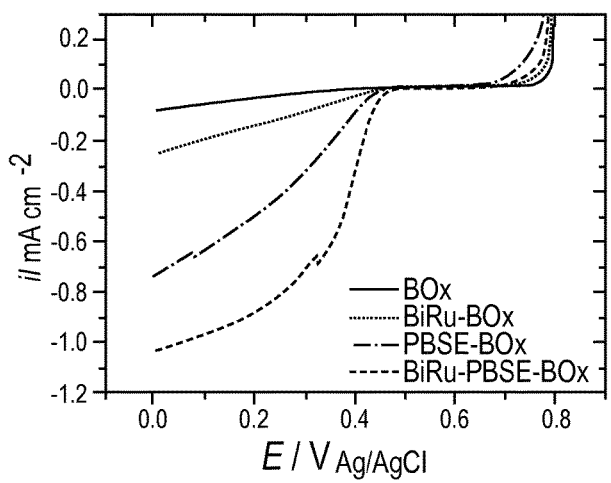
FIG. 29
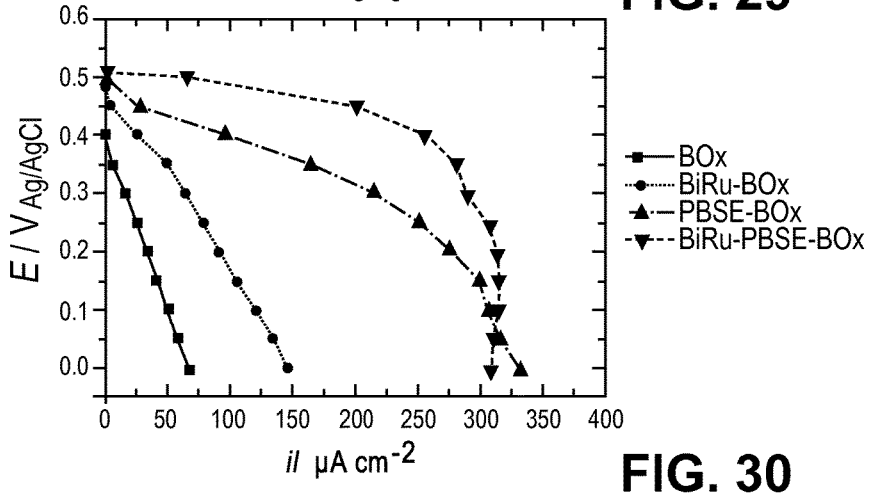
FIG. 30

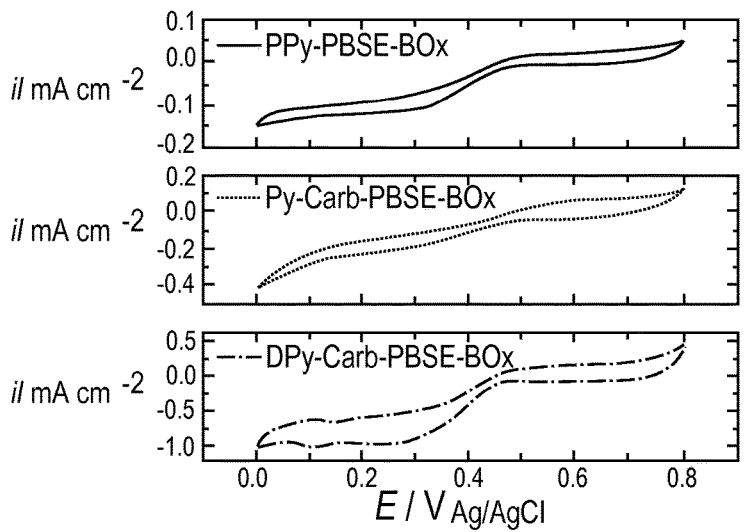
FIG. 33A
FIG. 33B
FIG. 33C
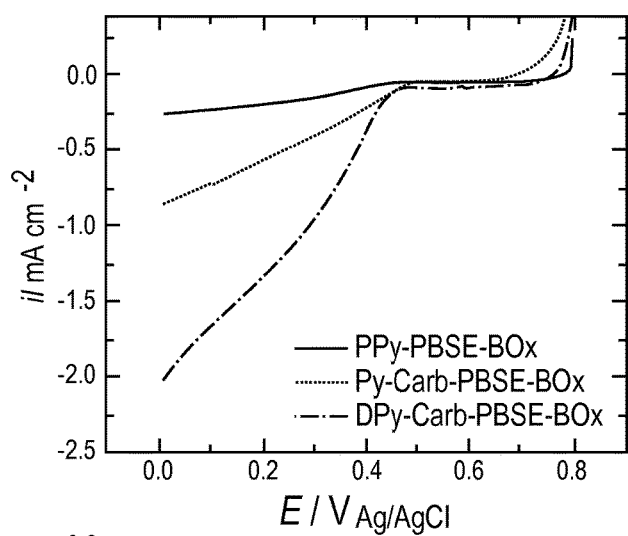
FIG. 34
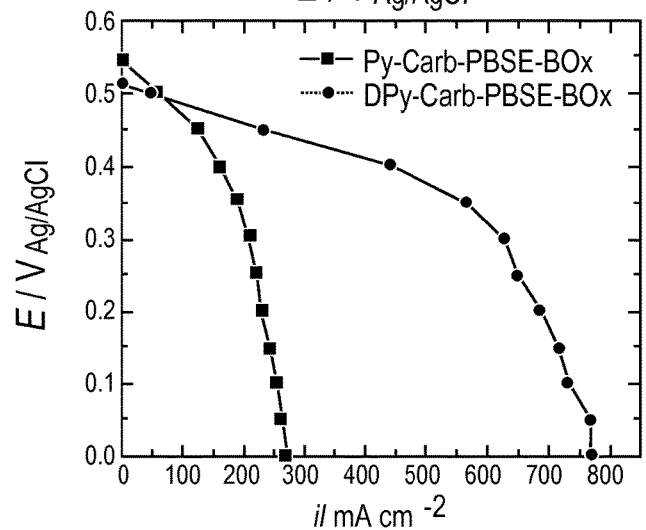
FIG. 35

HIGHLY EFFICIENT ENZYMATIC BIOANODES AND BIOCATHODES

CROSS-REFERENCE TO RELATED APPLICATIONS

The following application claims benefit of U.S. Provisional Application Nos. 61/751,368, filed Jan. 11, 2013, and 61/913,014, filed Dec. 6, 2013, each of which is hereby incorporated by reference in its entirety.

BACKGROUND

Fuel cells are receiving increasing attention as a viable alternative energy system. In general, fuel cells convert chemical energy into electrical energy in an environmentally clean and efficient manner, typically via oxidation of hydrogen or an organic fuel in the anodic half-cell coupled to an oxygen reduction reaction (ORR) in the cathodic half-cell. Fuel cells are contemplated as power sources for everything from small electronics to cars and homes. In order to meet different energy requirements, there are a number of different types of fuel cells in existence today, each with different chemistries, requirements, and uses.

Biofuel cells are fuel cells that rely on or mimic natural biological processes to produce power. Examples of biofuel cells include enzymatic fuel cells (EFCs), which use enzymes as the electrocatalysts and microbial fuel cells (MFCs), which use microorganisms for conversion of chemical energy to electricity. In general, the difference between EFCs and MFCs is that EFCs use only the enzymes that occur in nature while MFCs use the entire cell.

FIG. 1 shows a general diagram for an exemplary enzymatic biofuel cell using glucose and oxygen. In general, on the anode side, a fuel such as glucose is oxidized via, for example, a glucose oxidizing enzyme, thereby releasing electrons from the fuel. The electrons are then forced to travel around the electrolyte barrier via a wire, thereby generating an electric current. On the cathode side, oxygen is converted to water via, for example, an oxygen reducing enzyme.

Unlike traditional fuel cells which typically cannot use organic fuels due to carbon monoxide poisoning of their precious metal components, enzyme-based fuel cells are able to use organic compound-based fuels such as sugars and alcohols, which are attractive due to their abundance and relative inexpensiveness. There are a number of enzymes which are useful as biocatalysts in biofuels. Examples include PQQ-dependent dehydogenases, which are known to be naturally occurring oxidizing enzymes, and thus useful as biocatalysts in fuel cell anodes, and multi-copper oxidases (MCOs) which are well known biocatalysts for oxygen reduction and are thus useful in fuel cell cathodes.

The design of enzymatic fuel cells today is based on several decades of research focused on ensuring that each liberated electron is efficiently and rapidly transferred to a solid electrode, either via electron-carrying mediators, or via direct electron transfer from enzyme to electrode. However, today's enzyme fuel cells remain limited in power output and lifetime, and thus are ill-suited to power practical devices or applications.

The gist of the present challenge is to design fuel cells that allow rapid transport of electrons from bound enzymes to the electrode surfaces, and thereby circumvent the rate-limited performance of current designs. More specifically, the cathodes in these fuel cells must be designed to ensure an ever-present three-phase-interface between electrolyte, air and enzyme, a condition which is essential for oxygen-reducing enzymes to turn over at their maximum rate. One difficulty in EFCs is that the enzymes must be immobilized near their respective anodes and cathodes, as, if they are not immobilized, the enzymes will diffuse into the fuel. Furthermore, the system must include a mechanism for fast electron transfer of the liberated electrons to and from the electrodes. There are three main paths for enzyme immobilization onto nanocomposite electrodes: i) physical adsorption; ii) using linkers for covalent attachment of the enzyme; iii) encapsulation of the enzyme in polymeric matrix. All this methods have one main disadvantage, the enzyme is randomly oriented on the electrode surface, which means that any particular enzyme may or may not be capable of performing at its optimum level as either a catalyst or participant in electron transfer. Furthermore, because the orientation is random, the current output is neither consistent nor reproducible from one electrode to another, which is a significant problem for mass production.

SUMMARY

The present disclosure provides a biofuel cell comprising an anode and cathode wherein biocatalytic enzymes are purposefully oriented at each side of the fuel cell so as to increase and/or optimize the enzymes' performance in catalysis and/or electron transfer. The disclosure further provides methods for orienting biofuel catalysts on a nanoscale support so as to optimize the interfacial interactions between the catalysts and the support. The disclosure further provides a support having bound thereto specifically oriented enzymes. According to a specific embodiment, the present disclosure provides a biofuel anode comprising specifically oriented fuel oxidizing enzymes. According to another specific embodiment, the present disclosure provides a biofuel cathode comprising specifically oriented oxygen reducing enzymes.

BRIEF DESCRIPTION OF THE DRAWINGS

FIG. 28a shows cyclic voltammetry 1 mV s$^{-1}$ of physically adsorbed BOx on MWNTs.

FIG. 28b shows cyclic voltammetry 1 mV s$^{-1}$ of physically adsorbed BOx on MWNTs oriented with bilirubin (BiRu-BOx).

FIG. 28c shows cyclic voltammetry 1 mV s$^{-1}$ of physically adsorbed BOx tethered to MWNTs with PBSE (PBSE-BOx).

FIG. 28d shows cyclic voltammetry 1 mV s$^{-1}$ of MWNT-BOx cathodes BOx tethered to MWNTs with PBSE and oriented towards the electrode surface with bilirubin (BiRu-PBSE-BOx).

FIG. 29 shows a graph of rotating disc electrode measurements, 1600 RPM, 1 mV s$^{-1}$ of MWNT-BOx cathodes: physically adsorbed BOx on MWNTs; physically adsorbed BOx on MWNTs oriented with bilirubin (BiRu-BOx); BOx tethered to MWNTs with PBSE (PBSE-BOx); BOx tethered to MWNTs with PBSE and oriented towards the electrode surface with bilirubin (BiRu-PBSE-BOx).

FIG. 30 shows potentiostatic polarization curves of MWNT-BOx cathodes: physically adsorbed BOx on MWNTs; physically adsorbed BOx on MWNTs oriented with bilirubin (BiRu-BOx); BOx tethered to MWNTs with PBSE (PBSE-BOx); BOx tethered to MWNTs with PBSE and oriented towards the electrode surface with bilirubin (BiRu-PBSE-BOx).

FIG. 33a shows cyclic voltammetry, 1 mV s$^{-1}$, of MWNT-PBSE-BOx cathodes with chemically polymerized pyrrole (PPy-PBSE-BOx) for enzyme orientation.

FIG. 33b shows cyclic voltammetry, 1 mV s$^{-1}$, of MWNT-PBSE-BOx cathodes with chemically polymerized pyrrole-2-carboxaldehyde (PY-Carb-PBSE-BO) for enzyme orientation.

FIG. 33c shows cyclic voltammetry 1 mV s$^{-1}$, of MWNT-PBSE-BOx cathodes with chemically polymerized 2,5-dimethyl-1-phenyl-1H-pyrrole-3-carbaldehyde (DPy-Carb-PBSE-BOx) for enzyme orientation.

FIG. 34 shows rotating disc electrode measurements, 1600 RPM, 1 mV s$^{-1}$, of MWNT-PBSE-BOx cathodes with chemically polymerized pyrrole (PPy-PBSE-BOx), pyrrole-2-carboxaldehyde (PY-Carb-PBSE-BO), and 2,5-dimethyl-1-phenyl-1H-pyrrole-3-carbaldehyde (DPy-Carb-PBSE-BOx) for enzyme orientation.

FIG. 35 shows potentiostatic polarization curves of MWNT-PBSE-BOx cathodes with chemically polymerized pyrrole (PPy-PBSE-BOx), pyrrole-2-carboxaldehyde (PY-Carb-PBSE-BO), and 2,5-dimethyl-1-phenyl-1H-pyrrole-3-carbaldehyde (DPy-Carb-PBSE-BOx) for enzyme orientation.

FIG. 36c shows a cyclic voltammogram of Lac/MWNT with syringaldazine and PBSE, 10 mV/s.

DETAILED DESCRIPTION

According to an embodiment, the present disclosure provides a biofuel cell, or components, comprising one or more electrodes wherein immobilized biocatalytic enzymes are purposefully oriented at one or both sides of the fuel cell so as to increase and/or optimize the enzymes' performance in catalysis and/or electron transfer. In general, the present disclosure provides a mechanism by which enzymes which are useful catalysts in biofuel cells are immobilized to the surface of an electrode in a specific non-random orientation, wherein the specific non-random orientation is selected so as to increase or optimize the enzyme's catalytic performance and electron transfer rate in comparison to the same or similar immobilized, randomly oriented enzymes, such as when the enzymes are immobilized via a tethering agent alone.

For the purposes of the present disclosure, the terms "biocatalytic enzyme," "catalytic enzyme" and "enzyme" are used interchangeably and are intended to refer to an enzyme containing an active center which is able to catalyze either an oxidation or reduction reaction.

Figure 1:
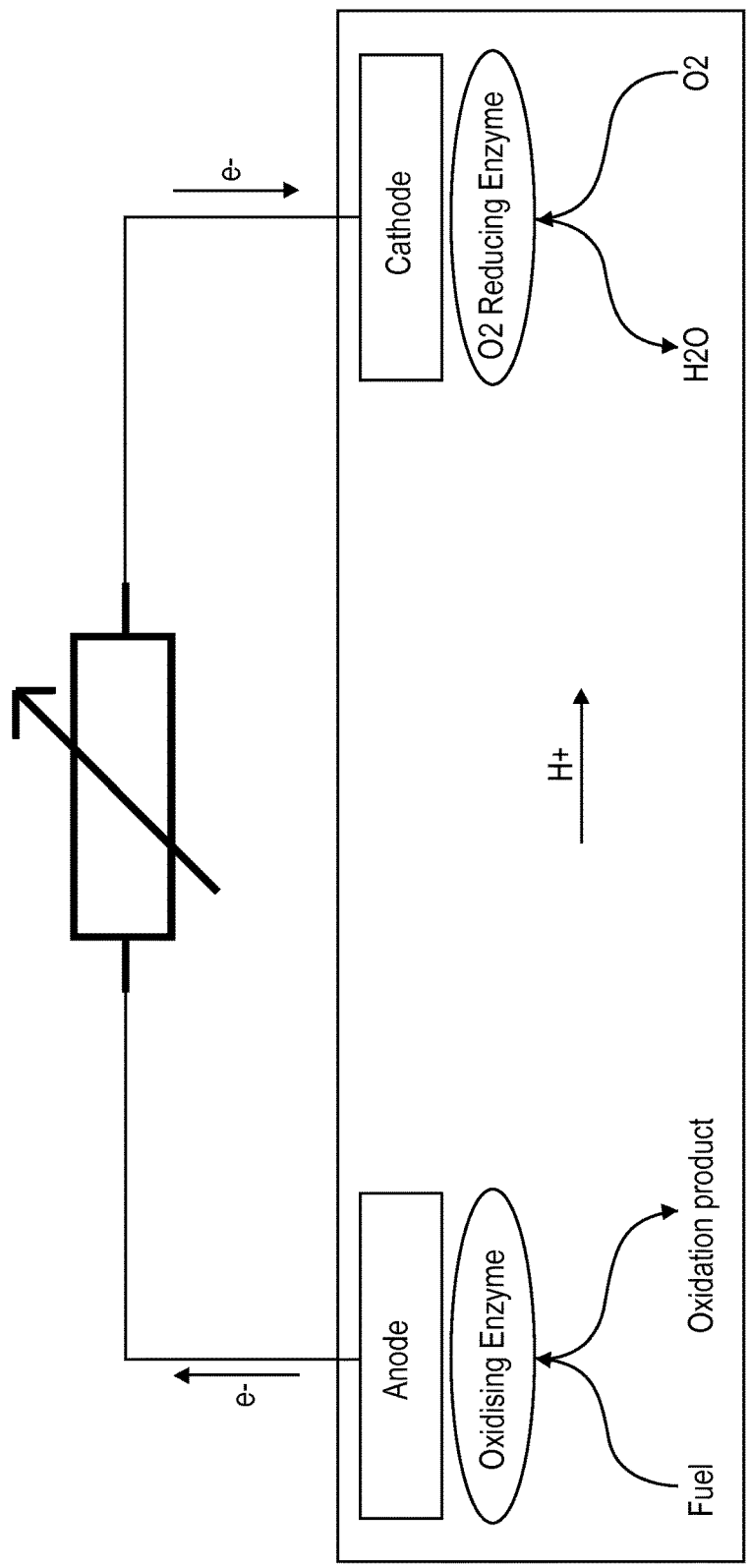
FIG. 1 is a schematic illustration of an exemplary enzymatic fuel cell.
Figure 2:
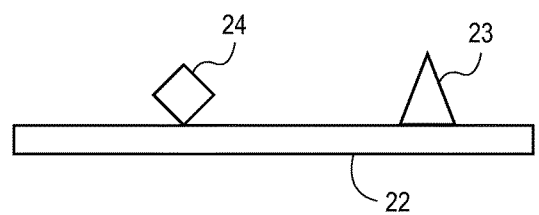
FIG. 2 is a schematic illustration of a substrate displaying both immobilization and orientation agents.

A schematic illustration of the general concept of an embodiment of an electrode suitable for use in a catalytic reaction is shown in FIG. 2. As shown, the surface of electrode 22 presents both a linking agent 23 and an orienting agent 24. The present disclosure makes frequent reference to the immobilization of catalytic enzymes on the surface of an "electrode," as one of the many applications for the presently described inventions is for use in biofuel cells, and specifically enzymatic biofuel cells. However it should be understood that the use of the term "electrode" is not intended to limit the presently disclosure or described inventions to those applications wherein the catalytic enzymes are immobilized to an electrode and that many other applications, including any in which it is desirable to achieve a specific orientation of catalytic enzymes immobilized to any solid support, supporting material, substrate, or the like are contemplated by the present disclosure. (Because the term "substrate," when used in the context of enzymology, refers to the molecule on which an enzyme acts and, when used in the context of materials science, refers to a supporting material to which various molecules or other materials can be anchored, immobilized, or otherwise attached, and either definition could be relevant to the present disclosure, care has been taken to avoid the use of this term or to used it only when the intended meaning is clear from the context of the sentence. However, because "substrate" in the materials science context is a term which can be interpreted broadly, it should be understood that the term is omitted or used infrequently only to avoid confusion and not because such broad interpretation is not contemplated by the present disclosure.)

In general, the linking agent 23 is typically a bi-functional compound that is able to simultaneously bind to both a desired catalytic enzyme and the selected support, thereby linking or tethering the enzyme to the support. Examples of suitable linking agents include, but are not necessarily limited to pyrene containing compounds. Those of skill in the art will be familiar with a wide variety of linkers that would be suitable for use in the presently disclosed embodiments. Exemplary linkers include, but are not necessarily limited to: 1-pyrenebutanoic acid, succinimidyl ester (PBSE) and 4,4'-[(8,16-Dihydro-8,16-dioxo-dibenzo[a,j] perylene-2,10-diyl)dioxy]dibutyric acid di(N-succinimidyl ester) (DDPSE), which are well known and commonly applied.

Figure 3:
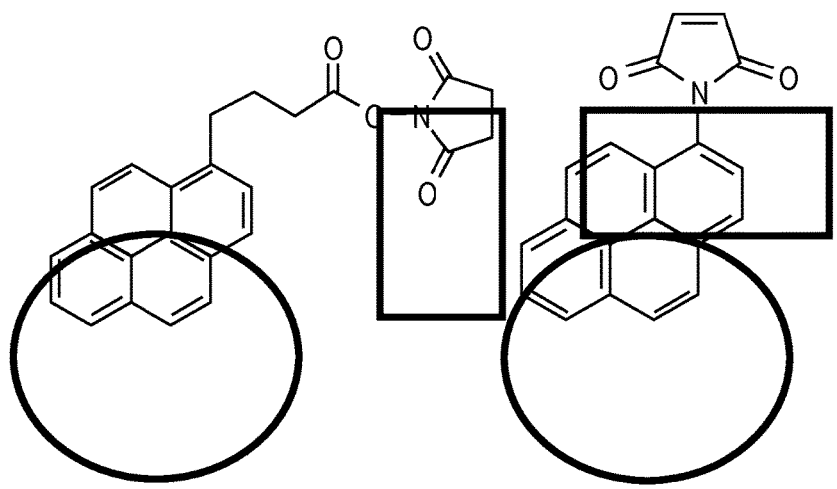
FIG. 3 is the chemical structure of PBSE and N-(1-Pyrenyl)maleimide.

In general, the role of the linking agent is to attach the enzyme to the support surface, which while it may provide a small degree of orientation, does not ensure that the active centers of the enzyme are pointed towards the surface of the support. The tethers identified above (PBSE and DDPSE) are useful when the support being used is or includes carbon, as they have a first functional group that covalently attaches to a specific site on a protein and a second functional group that attaches to carbon-based material. Typically, the first group is an imine group that binds with the amino groups of the enzyme, forming amide bonds. The second group interacts with carbon via $\pi$-$\pi$ stacking of the polyaromatic pyrenyl moieties. Another suitable linker, disclosed herein is N-(1-Pyrenyl)maleimide (structure shown in FIG. 3), which has not previously been described as a tethering agent. Its structure is very similar to PBSE, but the distance between the pyrene moieties and the imine group is shorter, which ensures close contact between the enzyme and the nanomaterial.

As explained above, while the linking agent may provide some degree of orientation by virtue of it linking a specific part of the enzyme to the support, it is not capable of ensuring that the active site of the enzyme is oriented towards the surface of the support. This orientation is achieved by the presence of orienting agent 24.

Figure 4:
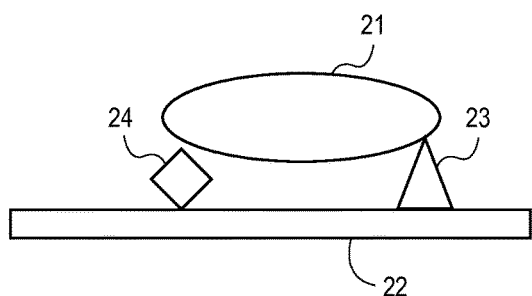
FIG. 4 is a schematic illustration of a biocatalytic enzyme bound to a substrate via a linking agent and oriented via an orientation agent.

Turning now to FIG. 4, it can be seen that a catalytic enzyme 21 is immobilized to the support 22 via the linking agent 23 and, as described in greater detail below, that the specific orientation of the catalytic agent is affected and/or determined by the presence of the orienting agent 24, which is typically a natural electron donor or acceptor of the catalytic agent, or a structural analogue thereof.

The presence of the catalytic enzyme's natural electron donor or acceptor (or structural analogue thereof) on the surface of the support causes the immobilized enzyme to orient itself such that the electron donor or electron acceptor center of the enzyme is pointed towards the surface of the support, thereby enabling easy and direct electron transfer between the enzyme and the support. Accordingly, for the purposes of the present disclosure, the term "orienting agent" or, more specifically, "enzyme orienting agent" or "catalytic enzyme orienting agent" is used to refer to a chemical compound, the presence of which on a support structure, causes a catalytically active enzyme to orient its catalytic active center towards the surface of the support, thereby resulting in increased electron transfer efficiency between the enzyme and the support when compared to the electron transfer efficiency of randomly oriented enzymes.

According to various embodiments the support is a fuel cell electrode. According to some embodiments the electrode is an anode while according to other embodiments the electrode is a cathode. When used as a fuel cell electrode the support may be formed from any carbon containing substrate suitable for use in the selected type of fuel cell. Examples of suitable material include, but are not necessarily limited to carbon, carbon nanotubes (CNTs), carbon black, graphene sheets, graphene wafers, etc.

It will be appreciated that if the electrode is an anode, the enzymes are typically oxidizing enzymes and the orienting agent will typically be the naturally occurring electron acceptor for the enzyme, or a structural analogue thereof. Examples of oxidizing enzymes include pyrroloquinoline quinone (PQQ)-dependent enzymes such as, for example, PQQ-dependent glucose dehydogenase, PQQ-depending alcohol dehydrogenase, PQQ-dependent aldehyde dehydrogenase and other types of enzymes, having covalently linked cofactor.

Figure 5:
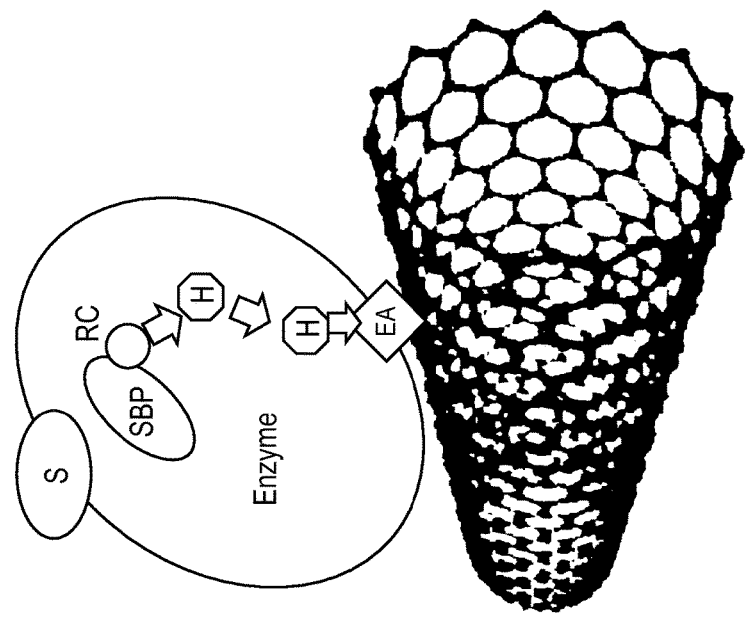
FIG. 5 is a schematic illustration showing pyrroloquinoline quinone-dependent glucose dehydrogenase (PQQ-GDH) immobilized to a substrate and oriented with respect to the support via its electron acceptor.
Figure 6:
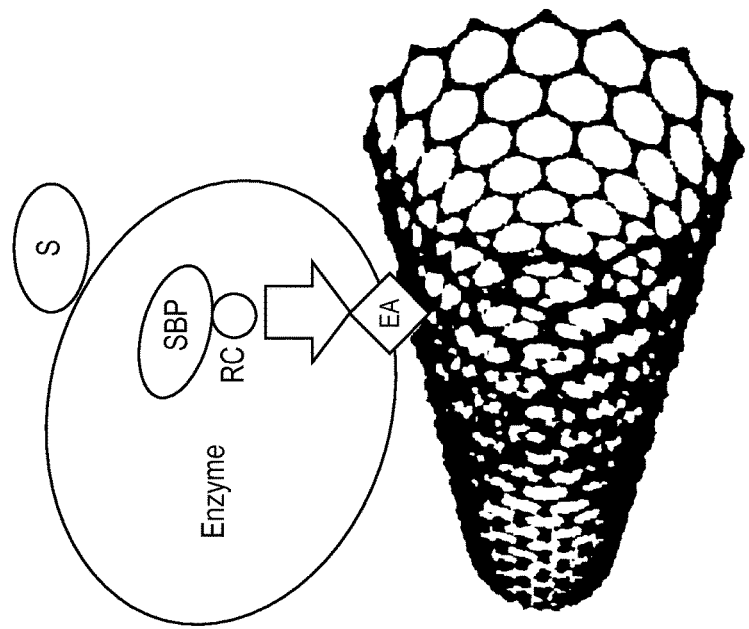
FIG. 6 is a schematic illustration showing quinohemoprotein immobilized to a substrate and oriented with respect to the support via its electron acceptor.

Those of skill in the art may be familiar with PQQ-dependent enzymes. However, these enzymes are not well studied or explored in biofuel cell applications primarily because the PQQ prosthetic group, which is responsible for the oxidizing behavior, is buried deeply into the enzyme molecule resulting in a very low efficiency enzyme/electrode interaction. Moreover, the substrate-binding portion of the oxidizing enzyme is not necessarily located near the electron transfer portion of the enzyme. This especially holds true when the enzyme has more than one cofactor, such as the quinohemoproteins, which can have one or more heme groups. As a consequence, any orientation of the enzyme resulting from simply immobilizing the enzyme to an electrode via a linking agent is not typically effective in biofuel cell anode applications, as efficiency is achieved by increased proximity of the enzyme's active site to the anode surface. As shown in FIG. 5 the present disclosure overcomes these limitations by presenting a compound that the PQQ-dependent enzyme recognizes as an electron acceptor on the surface of the support to which the PQQ-dependent enzyme is tethered. As a result, the enzyme naturally orients itself to position the electron transfer moiety of the enzyme facing towards and positioned as close to the support surface as possible, significantly increasing the enzyme/electrode interaction in terms of electron transfer rate and thus the overall efficiency of the enzyme mediated oxidation reaction, as shown and described in the Examples section below. FIG. 6 shows an exemplary embodiment in which both PQQ and hemes are used as orienting agents.

As stated above, the orienting agent for anodic enzymes can be either the naturally occurring electron acceptor or a structural analogue thereof. According to some embodiments, the orienting agent is a compound which possesses sufficient structural similarities to the naturally occurring electron acceptor that the presence of the orienting agent in the support surface causes the catalytic enzyme to orient the portion of the enzyme responsible for the electron transfer towards the support surface.

Figure 7:
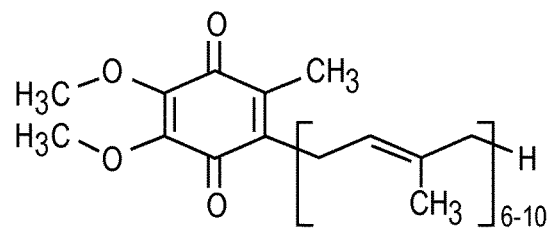
FIG. 7 is the chemical structure of Uniquinone, a naturally occurring electron donor for PQQ-dependent dehydrogenases.
Figure 8:
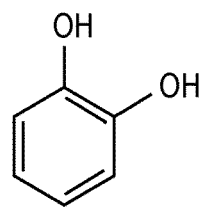
FIG. 8 is the chemical structure of Catechol, which acts, according to an embodiment of the present disclosure, as a functional analogue of ubiquinone.
Figure 9:
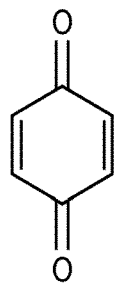
FIG. 9 is the chemical structure of 1,4-benzoquinone, which acts, according to an embodiment of the present disclosure, as a functional analogue of ubiquinone.

As an example, the naturally occurring electron acceptor for PQQ-dependent glucose dehydrogenase (PQQ-GDH) is ubiquinone, the chemical structure of which is shown in FIG. 7. In nature, ubiquinone is typically found in the cell membrane. In vivo, electrons liberated by PQQ-GDH are transferred to the terminal unibquinol oxidase enabling the organism to generate bioenergy. However, because it is not necessary for the orienting agent to perform any function other than simply acting as an "attractant" to encourage the specifically desired orientation of the catalytic enzyme, smaller, more tailored analogues of uniquinone can also be used. For example, both catechol (FIG. 8) and 1,4-benzoquinone (FIG. 9), when expressed on the surface of an anode in combination with a linking agent resulting in significantly increased activity in comparison to traditional bioanodes wherein oxidation is carried out by randomly oriented PQQ-GDH. Moreover, in some cases, anodes displaying the smaller electron donor analogues result in higher efficiency than anodes displaying the naturally occurring electron acceptor. Other possible structural analogues include, but are not limited to chemical compounds belonging to the family of quinones.

It will be similarly appreciated that if the electrode is a cathode, the enzymes are typically oxygen reducing enzymes and the orienting agent will typically be the naturally occurring electron donor, or a structural analogue thereof. Examples of reducing enzymes include multi-copper oxidases (MCOs) such as bilirubin oxidase, laccase, ascorbate oxidase, small laccase and the like.

Those of skill in the art will be familiar with MCOs, which are a category of naturally occurring oxygen reducing enzymes. MCOs, also referred to as blue copper oxidases, are generally considered to be very active for electrochemical oxygen reduction applications in biofuel cells and especially enzymatic fuel cells. The main advantage of this group of enzymes is the fact that they can perform direct electron transfer (DET). In enzymatic fuel cells, direct electron transfer is particularly preferable when implantable biofuel cells are to be used because DET does not require the use of artificial mediators, which are unstable, toxic and expensive.

Figure 10:
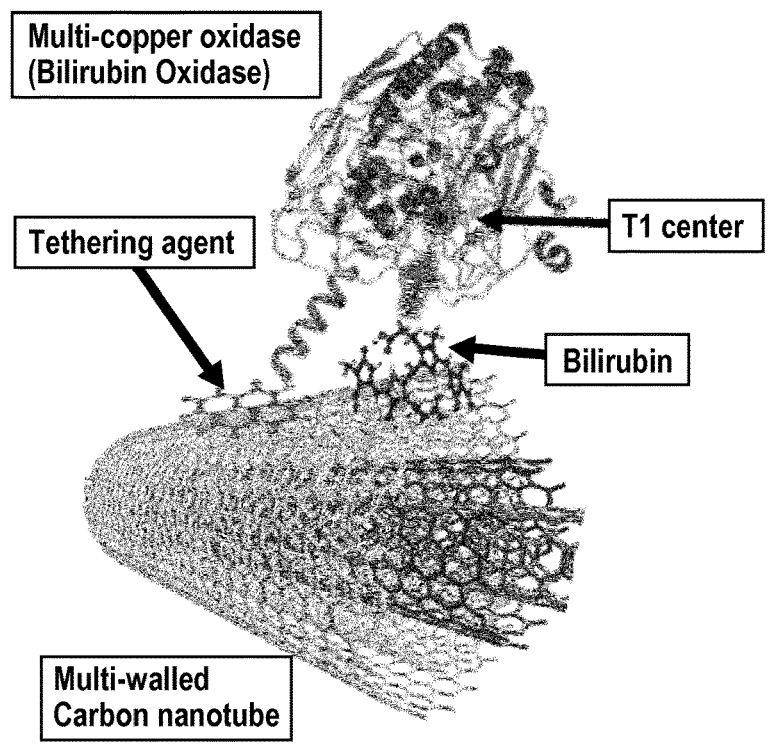
FIG. 10 is a schematic illustration showing the multi copper oxidase (MCO) bilirubin oxidase (BOx) immobilized to a solid support and oriented with respect to the support via an orienting agent.

A particularly well known MCO which is know for high activity towards oxygen reduction to water is bilirubin oxidase. However, the T1 active center, which is responsible for electron acceptance and subsequent oxygen transformation is situated on a specific part of the enzyme, depending on the tertiary structure of the enzyme, meaning that random orientation of the enzyme on the cathode surface results in less than optimal efficiency of the oxygen reduction reaction (ORR). As shown in FIG. 10, the present disclosure overcomes this limitation by providing the natural electron donor (or functional analogue thereof) on the surface of the support to which the enzyme is immobilized.

As stated above, the orienting agent can be either the naturally occurring electron donor of the enzyme or a structural analogue thereof. According to some embodiments, the orienting agent is a compound which possesses sufficient structural similarities to the naturally occurring electron donor such that the presence of the orienting agent on the support surface causes the catalytic enzyme to orient the T1 center of the enzyme responsible for the substrate oxidation towards the support surface.

Figure 11:
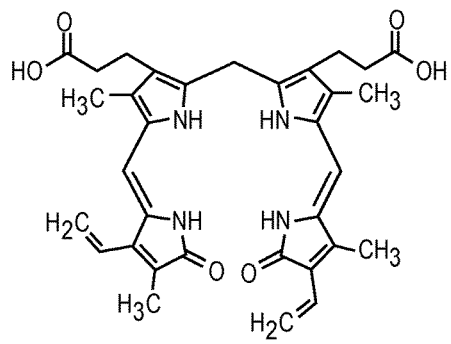
FIG. 11 is the chemical structure of Bilirubin, a naturally occurring electron donor for bilirubin oxidase.
Figure 12:
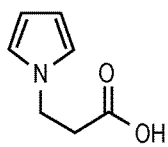
FIG. 12 is the chemical structure of 1H-Pyrrole-1-propionic acid, which acts, according to an embodiment of the present disclosure, as a functional analogue of bilirubin.
Figure 13:
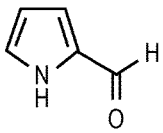
FIG. 13 is the chemical structure of Pyrrole-2-carboxaldehyde, which acts, according to an embodiment of the present disclosure, as a functional analogue of bilirubin.
Figure 14:
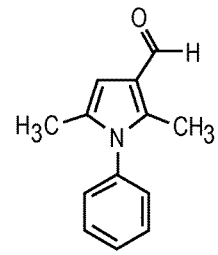
FIG. 14 is the chemical structure of 2,5-Dimethyl-1-phenyl-1H-pyrrole-3-carbaldehyde, which acts, according to an embodiment of the present disclosure, as a functional analogue of bilirubin.
Figure 15:
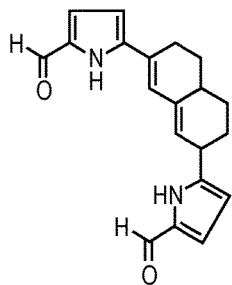
FIG. 15 is the chemical structure of 5,5'-(2,3,4,4a,5,6-hexahydronaphthalene-2,7-diyl)bis(1h-pyrrole-2-carbaldehyde), which acts, according to an embodiment of the present disclosure, as a functional analogue of bilirubin.
Figure 16:
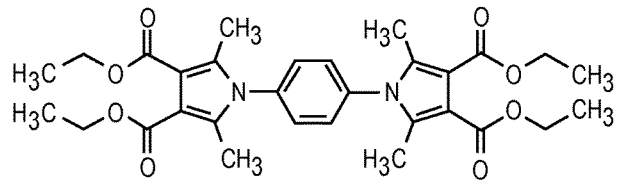
FIG. 16 is the chemical structure of Tetraethyl 1,1'-(1,4-phenylene)bis(2,5-dimethyl-1h-pyrrole-3,4-dicarboxylate), which acts, according to an embodiment of the present disclosure, as a functional analogue of bilirubin.

As a specific example, the naturally occurring electron donor of bilirubin oxidase is bilirubin, the structure of which is shown in FIG. 11. However, as with the anode example above, because it is not necessary for the orienting agent to perform any function other than simply acting as an "attractant" to encourage the specifically desired orientation of the catalytic enzyme, smaller, more tailored analogues of bilirubin can also be used. For example, we have found that 1H-Pyrrole-1-propionic acid (FIG. 12), Pyrrole-2-carboxaldehyde (FIG. 13), 2,5-Dimethyl-1-phenyl-1H-pyrrole-3-carbaldehyde (FIG. 14), 5,5'-(2,3,4,4a,5,6-hexahydronaphthalene-2,7-diyl)bis(1h-pyrrole-2-carb aldehyde) (FIG. 15), and Tetraethyl 1,1'-(1,4-phenylene)bis(2,5-dimethyl-1 h-pyrrole-3,4-dicarboxylate) (FIG. 16), all act, according to various embodiments of the present disclosure, as a functional analogues of bilirubin. Other possible functional analogues include, but are not limited to syringaldazine, ascorbic acid, etc.

Figure 17:
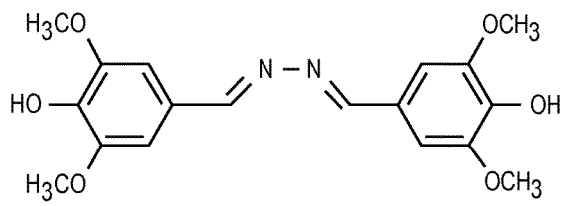
FIG. 17 is the chemical structure of Syringldazine, which is a naturally occurring substrate for laccase and thus useful as an orienting agent according to an embodiment of the present disclosure.

Another well known MCO is laccase. Syringldazine, shown in FIG. 17 is a natural substrate of laccase. Examples of functional analogues that could be used in place of syringldazine include, for example, catechol.

Those of skill in the art will be familiar with various methods for attaching the linking and orienting agents to a support. As an example, linking and orienting agents can be attached by physical adsorption.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Examples I

PQQ-GDH Bioanodes

Anode suspensions (inks) were prepared with 1% Multi Walled Carbon Nanotubes (MWNTs) in a 4:1 water:ethanol suspension and 0.1% Tetra-n-butylammonium bromide (TBAB)-Nafion polymer in absolute ethanol. The MWNTs/TBAB-Nafion suspension was then sonicated in a water bath for 30 minutes. Ubiquinone, and catechol were dissolved separately in absolute ethanol and added as required to the MWNTs/TBAB-Nafion suspension to produce a final concentration of 10 mM. In all cases, after the orienting agent was added to the MWNT suspension, the ink was allowed to rest for one hour before 1-pyrenebutanoic acid succinimidyl ester (PBSE) in absolute ethanol and the enzyme in 20 mM 3-(N-morpholino)propanesulfonic acid (MOPS) buffer (pH 6) with 6 mM $CaCl_2$ and 10 mM KCl, was added to a final concentration of 10 mM and 2 mg/mL, respectively. The final ink suspension was incubated for 2 hours at 25° C. before being tested. All ink experiments were carried out on a glassy carbon electrode. The experiments were performed in 20 mM MOPS buffer (pH 6) with 6 mM CaCl2 and 10 mM KCl inside a 20 mL glass electrochemical cell. Platinum wire was used as the counter electrode and the reference was a saturated Ag/AgCl electrode. For Linear Voltammetry and Cyclic Voltammetry (LV and CV) the working electrode potential was swept from a −0.6 V to 0.6 V at a scan rate of 10 mV/s. The potentiostatic polarization curves were carried out by chronoamperometric measurements of 300 seconds starting from the open circuit potential (OCP) of the electrode and decreasing to 0.3 V at 50 mV intervals. The substrate for PQQ-glucose dehydrogenase was 10 mM glucose.

Figure 18:
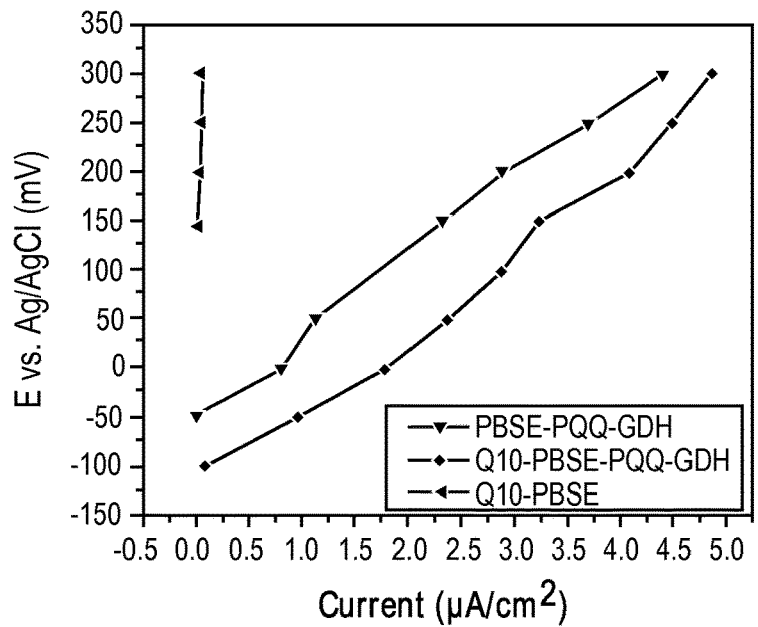
FIG. 18 shows a potentiostatic polarization curve of multi-walled nanotubes (MWNTs) ink containing: PBSE as a linker and PQQ-dependent glucose dehydrogenase (PQQ-GDH); the same ink composition with ubiquinone ($Q_{10}$) as orienting agent; and the ink with $Q_{10}$ without an enzyme as a control sample.
Figure 19:
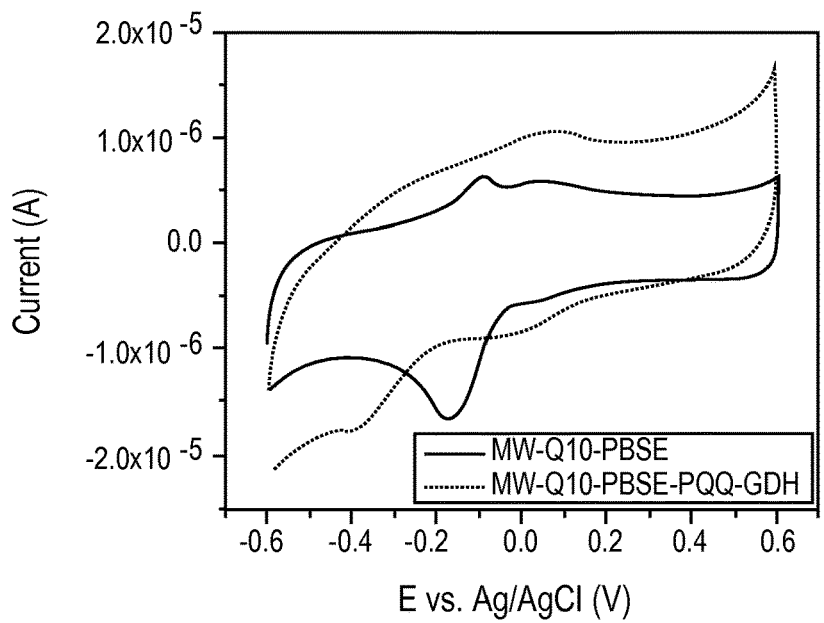
FIG. 19 shows cyclic voltammetry of the MWNTs ink, linker, and $Q_{10}$ orienting agent with and without PQQ-GDH.

FIGS. 18 and 19 provide data demonstrating that the addition of an orienting agent leads to an increase in the anode performance. Both the cyclic voltammetry study (FIG. 19) along with the carried out polarization curves (FIG. 18) show that there is a positive effect attributed to the presence of ubiquinone ($Q_{10}$). An increase in the generated current of approximately 42% was observed in the whole potential region tested.

Figure 20:
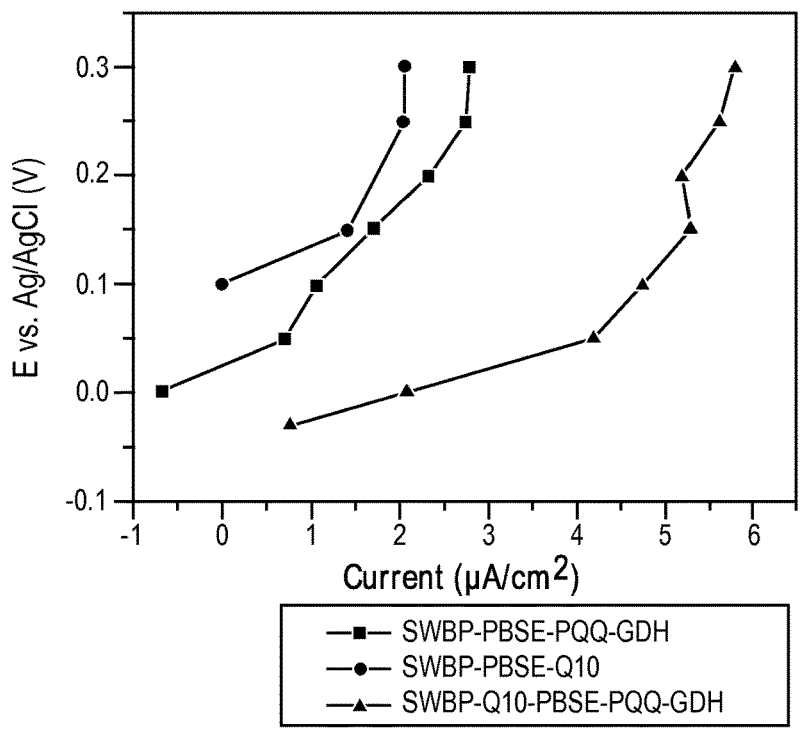
FIG. 20 shows a potentiostatic polarization curve of PQQ-GDH immobilized on single-walled carbon nanotube paper modified with PBSE as a linking agent and $Q_{10}$ as an orienting agent.

Along with the ink electrode composition, commercially available nanotubial paper Buckeye paper was used as an electrode material and as a support for enzyme immobilization. The Buckeye paper was cut (0.28 $cm^2$) and immersed in 10 mM solution of PBSE or 10 mM solution of the orienting agent ($Q_{10}$ or catechol) for 1 hour each step. In the case of orientation of the enzyme with $Q_{10}$, the orienting agent was first introduced into the system and then the PBSE attached. The next step was immobilization of the enzyme, which was achieved by immersion of the carbon paper in a solution of the enzyme (2 mg/ml) in 20 mM MOPS buffer (pH 6) with 6 mM CaCl2 and 10 mM KCl for 2 hours. The electrode was washed and tested (FIG. 20). A two times increase in the electrode performance was recorded proving the invention.

Figure 21:
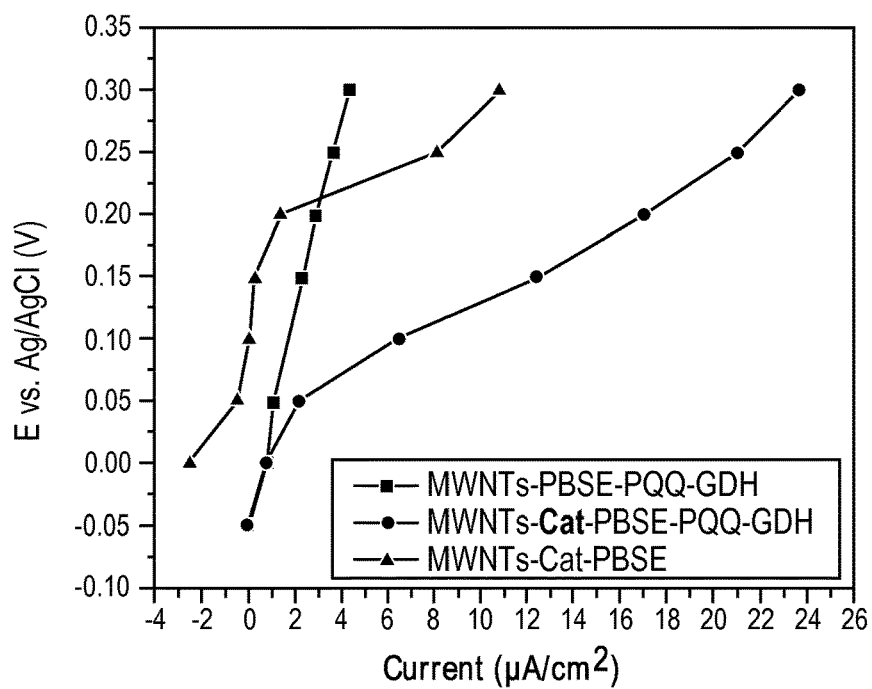
FIG. 21 shows a potentiostatic polarization curve of modified multi-walled carbon nanotubes with PBSE as a linker, catechol (Cat.) as orienting agent (ink composition), and PQQ-GDH.

The second organic compound tested as orienting agent was catechol. The same experiments as the ones performed with ubiquinone were carried out. The studies of the ink composition showed six-time increase in the current densities generated in presence of catechol (FIG. 21). With Density Functional Theory (DFT) calculations was determined that catechol carries out easier electrochemical transformations than ubiquinone, which explains the higher performance of the electrodes with catechol as orienting agent.

Figure 22:
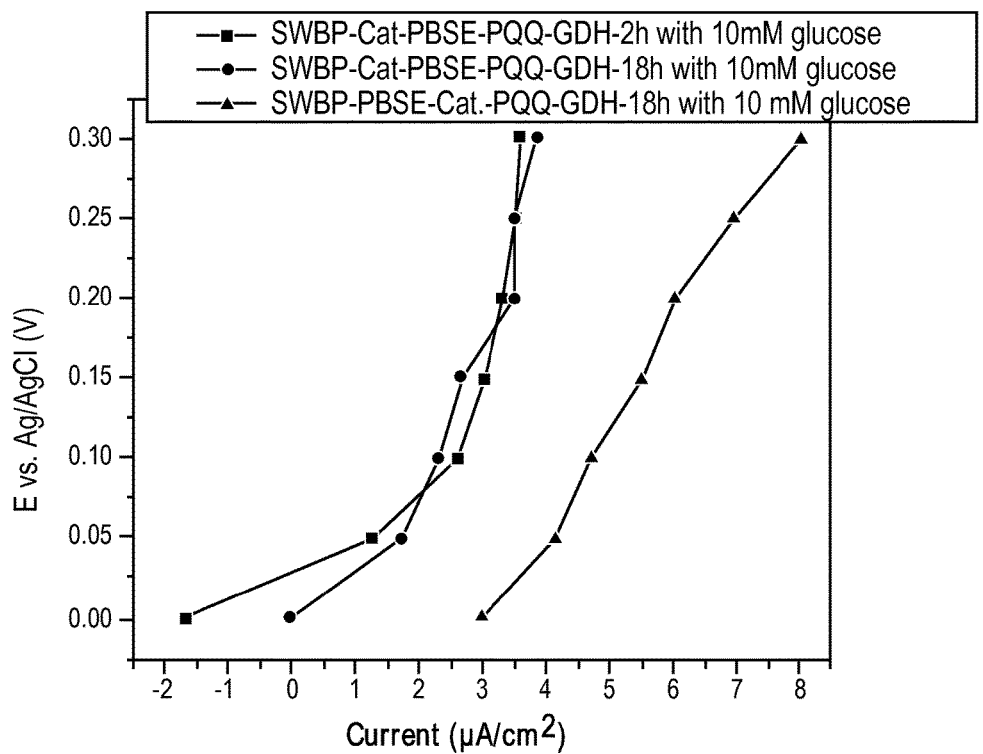
FIG. 22 shows a potentiostatic polarization curve of modified single-walled carbon nanotube paper with PBSE as a linker, catechol (Cat.) as orienting agent and PQQ-GDH.

The tests performed with single-walled nanotube paper (FIG. 22) also show better electron transfer rate and efficiency with catechol. Three-time higher current densities were recorded in this case.

Example II

BOx Cathodes

Figures 23, 24:
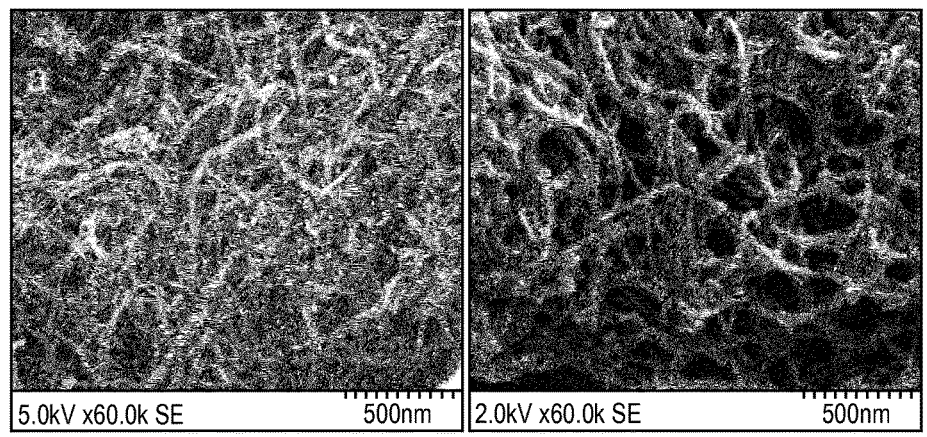
FIG. 23 is an SEM of drop case ink containing multi-walled carbon nanotubes and tetrabutylammonium bromide (TBAB) modified Nafion. Scale bar is 500 nm.
FIG. 24 is an SEM of drop case ink containing multi-walled carbon nanotubes, TBAB modified Nafion, 1-pyrenebutanoic acid, succinimidyl ester (PBSE), and billirubin oxidase (BOx) on glassy carbon. Scale bar is 500 nm.

Cathode suspensions (inks) were prepared with 1% MWNTs in a 4:1 water:ethanol suspension and 0.1% TBAB-Nafion polymer in absolute ethanol. The MWNTs/TBAB-Nafion suspension was then sonicated in a water bath for 30 minutes. Bilirubin, pyrrole-2-carboxaldehyde and 2,5-dimethyl-1-phenyl-1H-pyrrole-3-carbaldehyde were dissolved separately in absolute ethanol and added as required to the MWNTs/TBAB-Nafion suspension to a final concentration of 10 mM. In all cases, after the orienting agent was added to the MWNT suspension, the ink was allowed to rest for one hour before 1-pyrenebutanoic acid succinimidyl ester (PBSE) in absolute ethanol and bilirubin oxidase in 0.1 M phosphate buffer (7.5 pH), was added to a final concentration of 10 mM and 10 mg/mL, respectively. The final ink suspension was incubated for 12 hours at 4° C. before being tested (FIGS. 23 and 24). All RDE experiments were carried out on a glassy carbon electrode using a rotator. Before testing of each sample, the RDE was cleaned with alumina of increasingly fine grits of 1 µm, 0.3 µm, and 0.05 µm, rinsing with DI water between polishing. All experiments were performed in 0.1 M phosphate buffer (pH 7.5) with 0.1 M potassium chloride inside a 125 mL glass electrochemical cell. Platinum wire was used as counter electrode and the reference was saturated Ag/AgCl electrode. Oxygen or nitrogen gas was bubbled into the cell through plastic tubing as required. LV and CV working electrode potential was swept from a +0.8 V to 0.0 V at a scan rate of 10 mV/s. Rotation rates for LV experiments were varied from 0 RPM to 1600 RPM at 400 RPM intervals. The potentiostatic polarization curves were carried out by chronoamperometric measurements of 300 seconds starting from the open circuit potential (OCP) of the electrode and decreasing to 0.00 V at 50 mV intervals.

For the determination of the orientation efficiency, chronoamperometry was carried out at 0.300 V for 400 seconds in the previously mentioned electrochemical cell before and after the addition of 0.1 mM 2,2'-azino-bis(3-ethylbenzothiazoline-6-sulphonic acid) (ABTS).

Figure 25:
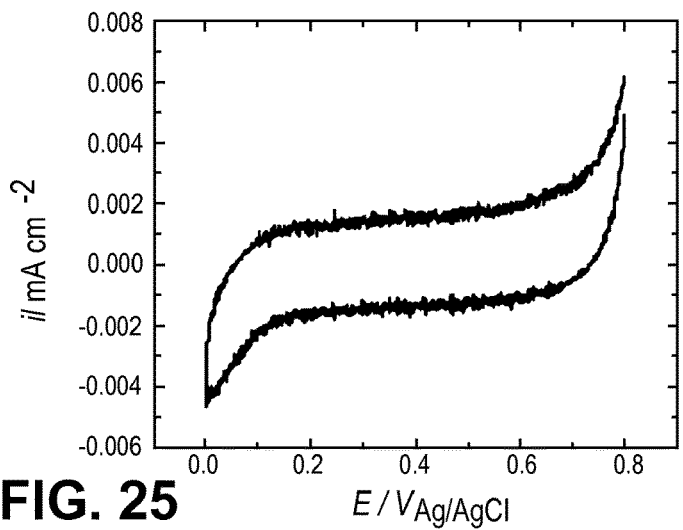
FIG. 25 shows cyclic voltammetry 1 mV s$^{-1}$ of MWNT/TBAB-Nafion bare cathode.
Figure 26:
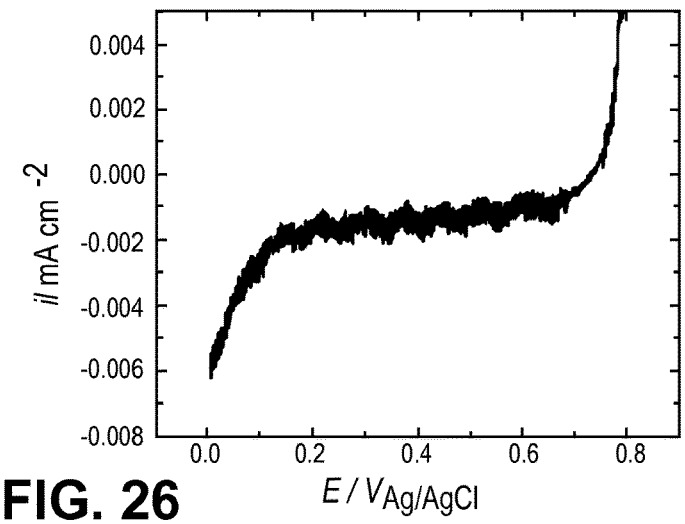
FIG. 26 shows a graph of rotating disc electrode measurements, 1600 RPM, 1 mV s$^{-1}$ of MWNT/TBAB-Nafion bare cathode.
Figure 27:
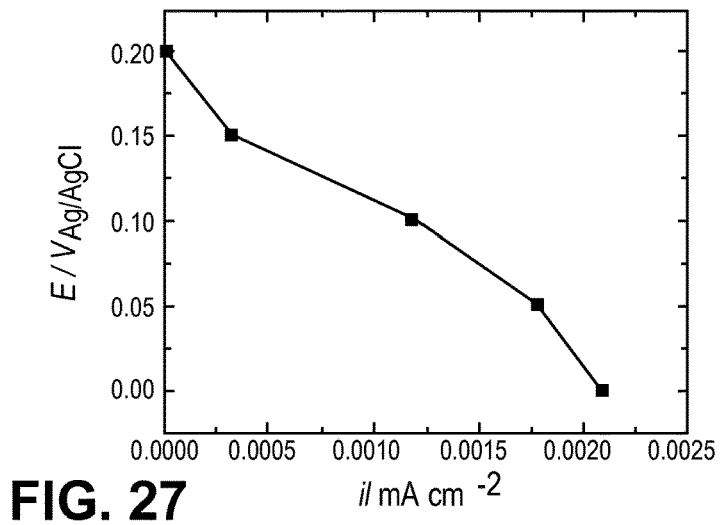
FIG. 27 shows a potentiostatic polarization curve of MWNT/TBAB-Nafion bare cathode.

The physically adsorbed BOx cathode was compared to the performance of a bare cathode (FIGS. 25-27) and cathodes modified with bilirubin (BiRu-BOx) and PBSE (PBSE-BOx) only as well as a co-modified cathode (BiRu-PBSE-BOx) (FIGS. 28-30).

In the case of BOx modified cathodes, as evident from the CVs (FIG. 28), the onset potential of the oxygen reduction appears with increasing potential in the following order: physically adsorbed BOx cathode (0.410 V), BiRu-BOx cathode (0.450 V), PBSE-BOx cathode (0.455 V) and co-modified BiRu-PBSE-BOx cathode (0.482 V). A positive shift of the half wave potential (E1/2) and an increase of the generated current at 0.00 V can also be observed following the same trend. Due to fast interfacial electron transfer at the BiRu-PBSE-BOx cathode, a peak associated with the reduction of oxygen appears, identifying the potential at which diffusional limitations begin to dominate.

Figure 31:
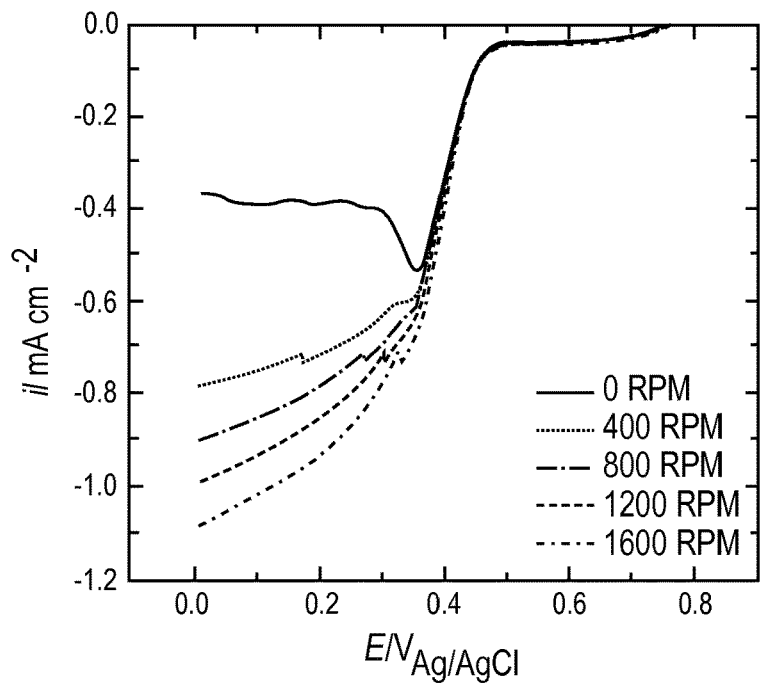
FIG. 31 shows rotating disc electrode measurements of modified BOx cathode tethered with PBSE and oriented towards the electrode surface with bilirubin at different rotating speeds.
Figure 32:
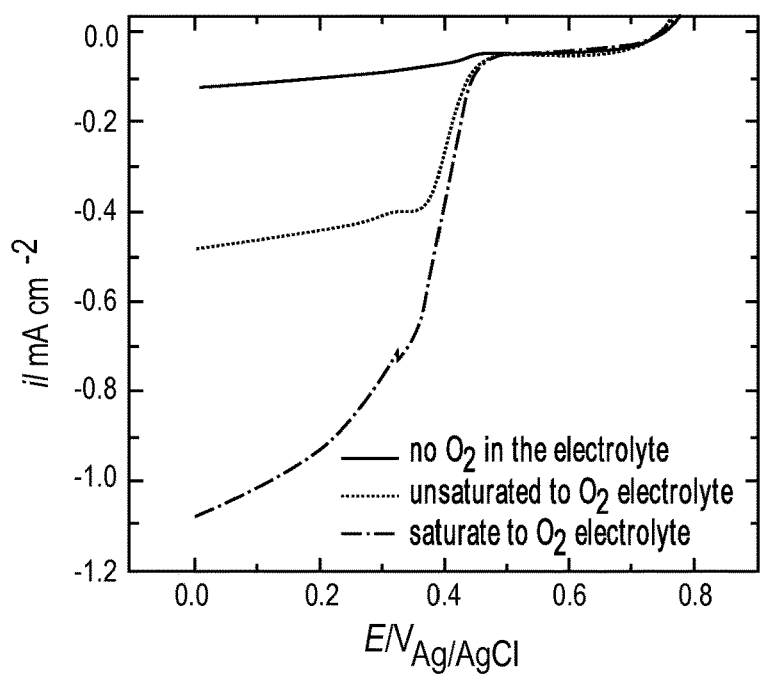
FIG. 32 shows rotating disc electrode measurements of modified BOx cathode tethered with PBSE and oriented towards the electrode surface with bilirubin at different oxygen concentrations in the electrolyte, 1600 RPM, 1 mV s$^{-1}$.

LVs with electrode rotation were used to study ORR on the enzymatic cathodes. In the absence of diffusional limitations, the differences in the performance of the cathodes are determined by the enzyme kinetics, subject to the interfacial electron transfer rate (FIG. 31). An increase in oxygen concentration in the electrochemical cell corresponds to an increase in the electrode operational characteristics (FIG. 32).

Pyrrole-2-carboxaldehyde and 2,5-dimethyl-1-phenyl-1H-pyrrole-3-carbaldehyde were used for enzyme orientation along with PBSE as the tethering agent.

The electrode modified with pyrrole-2-carboxaldehyde and PBSE (Py-Carb-PBSE-BOx) shows a more positive onset potential (0.486 V) (FIGS. 33-35) compared to the PBSE-BOx cathode. The 2,5-dimethyl-1-phenyl-1H-pyrrole-3-carbaldehyde (DPy-Carb-PBSE-BOx) modified cathode had a significantly higher generated current density compared to both the PBSE-BOx and BiRu-PBSE-BOx electrodes. The current density at 0.00 V potential from the CV (FIG. 33) along with the limiting current density form the RDE measurement (FIG. 34) as well as the maximum current from the polarization curves (FIG. 35) are approximately 2-2.5 times higher compared to the BiRu-PBSE modified cathodes. Polypyrrole modification was used as a control.

Figure 36:
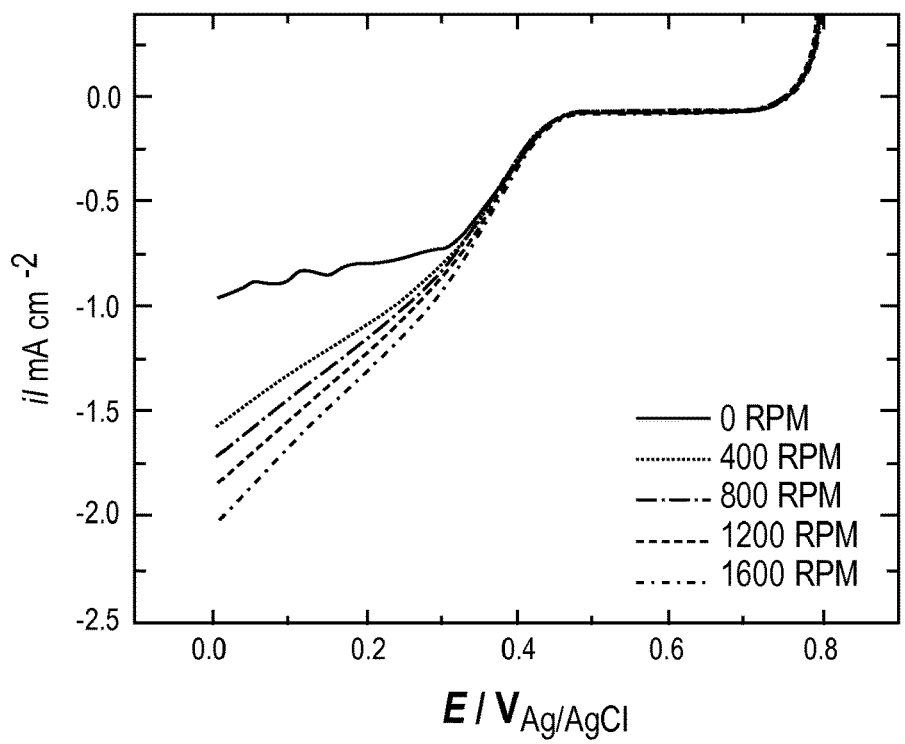
FIG. 36 shows rotating disc electrode measurements, 1 mV s$^{-1}$, of MWNT-PBSE-BOx cathode with 2,5-dimethyl-1-phenyl-1H-pyrrole-3-carbaldehyde as an orienting agent.

The current densities recorded with DPy-Carb-PBSE-BOx cathode without rotation of the electrode are in the same order of magnitude as the current density observed with BiRu-PBSE-BOx at 1600 RPM, which are 12 times higher than the unmodified BOx cathode at 1600 RPM. During rotation, the generated current attains even higher values (FIG. 36). The current density of DPy-Carb-PBSE-BOx at 1600 RPM was 20 times higher than physically adsorb BOx on MWNTs.

Figure 37:
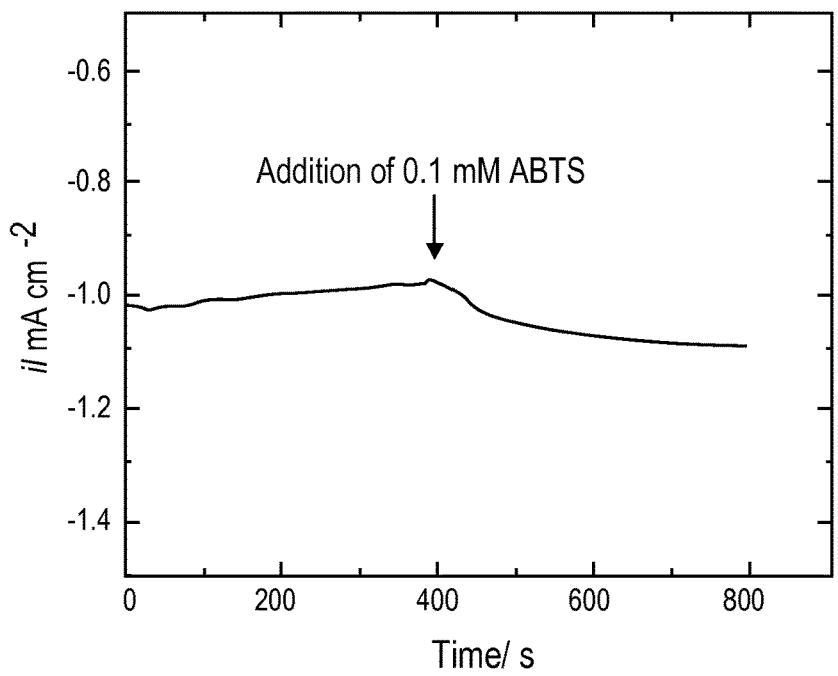
FIG. 37 shows chronoamperometry measurements of MWNT-PBSE-BOx cathode with 2,5-dimethyl-1-phenyl-1H-pyrrole-3-carbaldehyde as an orienting agent before and after the addition of 0.1 mM ABTS.

The orientation efficiency of the enzyme after the modification procedure with 2,5-dimethyl-1-phenyl-1H-pyrrole-3-carb aldehyde and PBSE was determined. The DPy-Carb-PBSE-BOx cathode was polarized with constant potential (0.300 V) and the corresponding current was measured (FIG. 37). When the current reached stable values, 0.1 mM 2,2-azinobis-(3-ethylbenzothiazoline-6-sulfonic acid) diammonium salt (ABTS) was added to the electrolyte and the current in presence of the mediator was monitored. The ratio of the current before and after ABTS addition was approximately 0.9, indicating that the orientation efficiency of the DPy-Carb-PBSE-BOx cathode was 90%.

Example III

Laccase Cathodes

As an alternative to BOx, we explored the integration of Laccase with multi-walled nanotubes. Laccase from Trameters hirsute was purified by dialysis and concentrated after the purification procedure to 13 mg/ml. Three carbon nanotubes composites were prepared and studied. The first one was a suspension of 1% multi-walled nanotubes with 0.1% of TBAB-Nafion in water:ethanol (4:1) mixture (MWNTs). The second composite (MWNTs-PBSE) contained 10 mM PBSE as a linker. A solution of PBSE in ethanol was added to the multi-walled nanotubes suspension and left for an hour to adsorb. The third composite contained 10 mM solution of syringaldazine in ethanol, playing the role of orienting agent (MWNTs-Syr-PBSE). The orienting agent was added to the nanotube suspension, followed by the addition of 10 mM PBSE. Each of it was left for an hour to attach.

10 µl from each suspension were dropped onto the surface of Rotating disk electrode and dried. Than 10 µl laccase were dropped onto the nanotube composite and also dried. The so prepared electrode was tested in three-electrode electrochemical cell in 0.1 M phosphate buffer, pH 6. Pt-wire was used as counter electrode and 3M Ag/AgCl was applied as reference electrode.

Figure 38A:
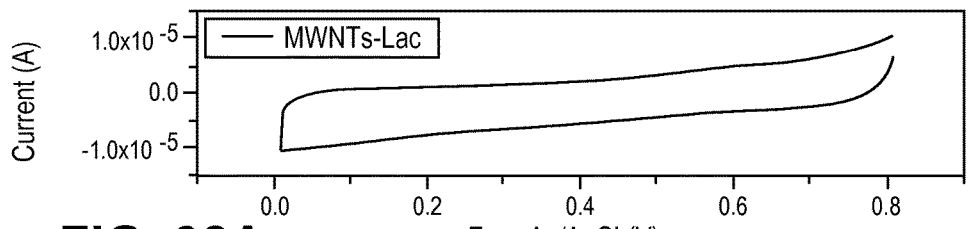
FIG. 38a shows a cyclic voltammogram of Lac/MWNT, 10 mV/s.
Figure 38B:
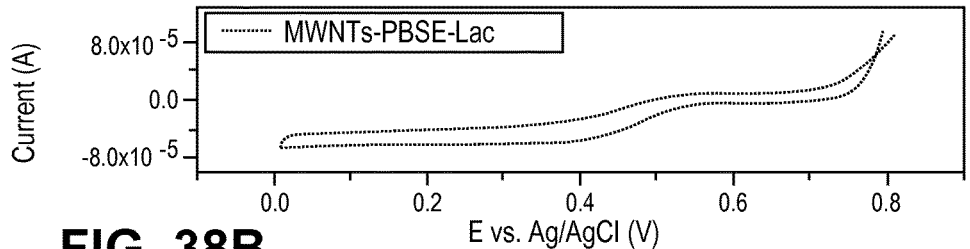
FIG. 38b shows a cyclic voltammogram of Lac/MWNT with PBSE, 10 mV/s.
Figure 38C:
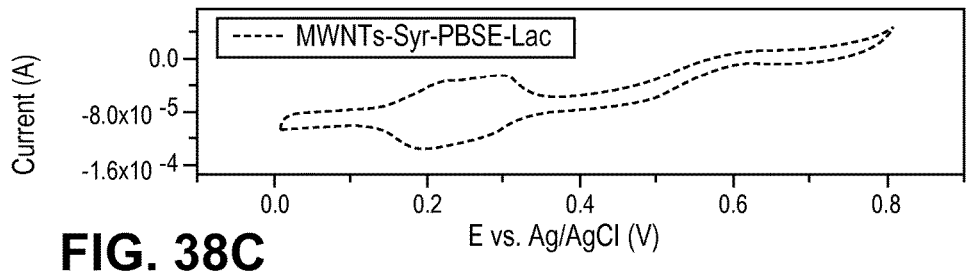
Figure 39:
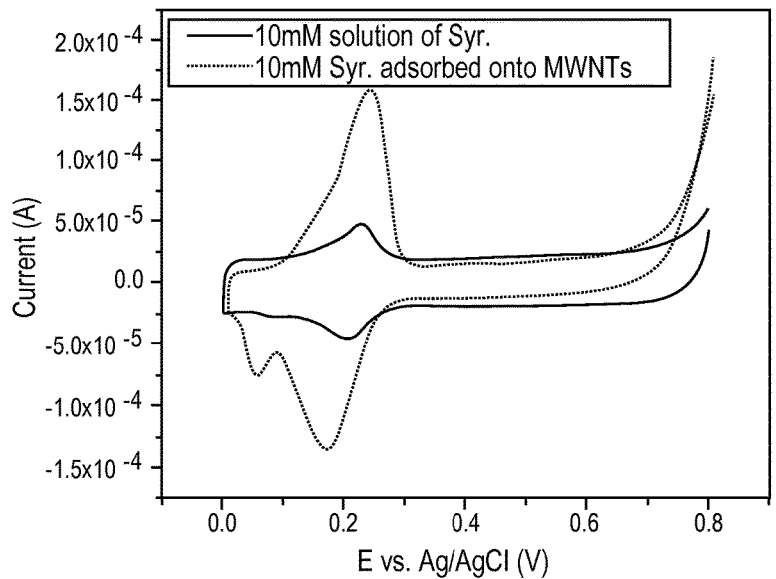
FIG. 39 shows cyclic voltammetry of syringaldazine in solution and adsorbed on MWNTs, scan rate 10 mV/s.
Figure 40:
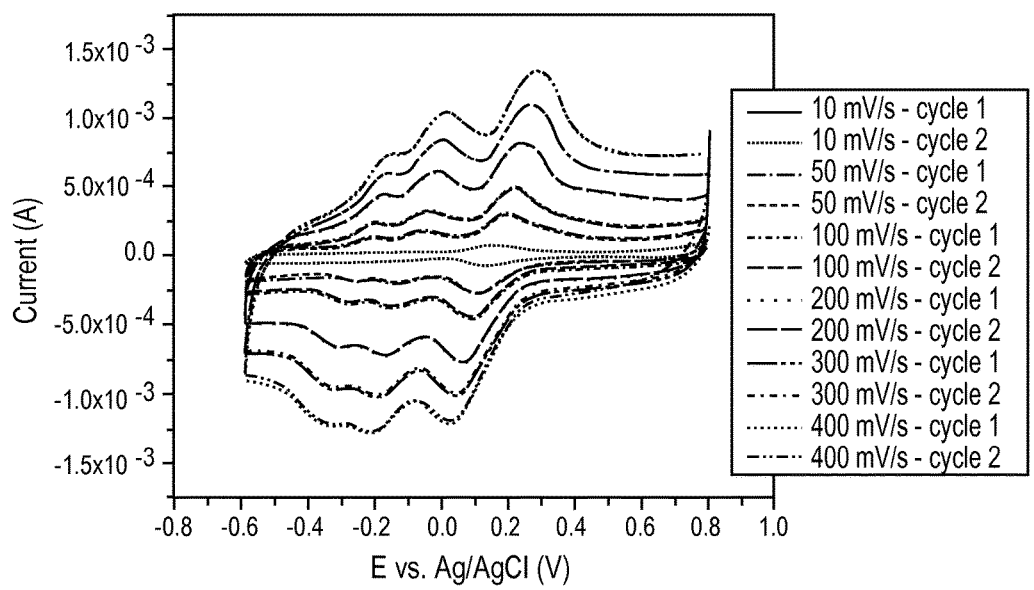
FIG. 40 shows cyclic voltammetry of syringaldazine adsorbed on MWNTs with varying scan rates.

Syringldazine is a natural substrate of laccase. It is often used to detect the presence and investigate the activity of laccase. In this case syringldazine was used as orienting agent similar to bilirubin for bilirubin oxidase. The regularity observed with bilirubin oxidase was confirmed also for laccase. FIGS. 38a-c represents cyclic voltammograms of the three enzyme/nanotubes composites. On all of them the reduction wave due to oxygen reduction can be clearly seen. The onset potential of the oxygen reduction in presence of syringaldazine as orienting agent is slightly higher than the other cases. The maximum reduction current recorded increases in the following order: MWNTs-Lac; MWNTs-PBSE-Lac; MWNTs-Syr-PBSE-Lac. The oxidation and reduction peaks at between 125 and 350 mV, are due to the electrochemical transformation of syringaldazine itself. Obviously this compound possesses electrochemical activity as it can be seen from the CVs of syringaldazine itself in solution and adsorbed onto nanotubes (FIG. 39). The electrochemistry of it is very complicated with several subsequent reversible reduction reactions (FIG. 40).

Figure 41:
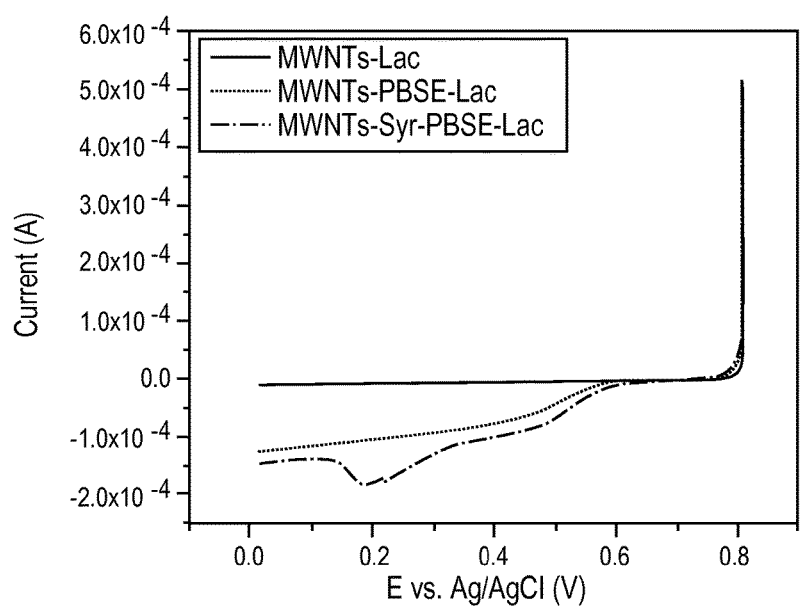
FIG. 41 shows Rotating Disk Electrode measurements of the three Lac/MWNTs composites: Lac, Lac with PBSE and Lac with syringaldazine and PBSE, 1600 rpm, 10 mV/s.

The same order of increasing current was observed during the rotating disk electrode measurements (FIG. 41). For the results comparison we took the current, generated at 400 mV, before the reduction of syringaldazine to occur. The current from the oxygen reduction recorded in presence of laccase natural substrate is 1.3 times higher than the linked enzyme and 16 times higher than the physically adsorbed one. It was also observed that the slope of the reduction wave is steeper when the enzyme is preliminary oriented with syringaldazine in comparison with the other types of enzyme immobilization techniques. This shows again that when an orienting agent is used the orienting efficiency increases significantly and the kinetic of the oxygen reduction is enhanced.

Figure 42:
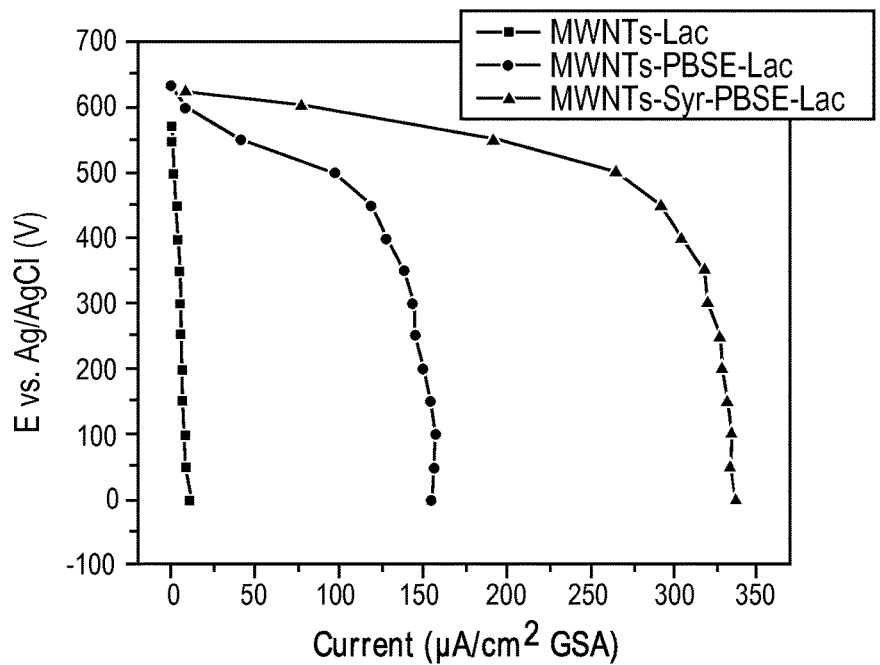
FIG. 42 shows potentiostatic polarization curves of the Lac/MWNTs composites normalized to the electrode geometrical surface area.
Figure 43:
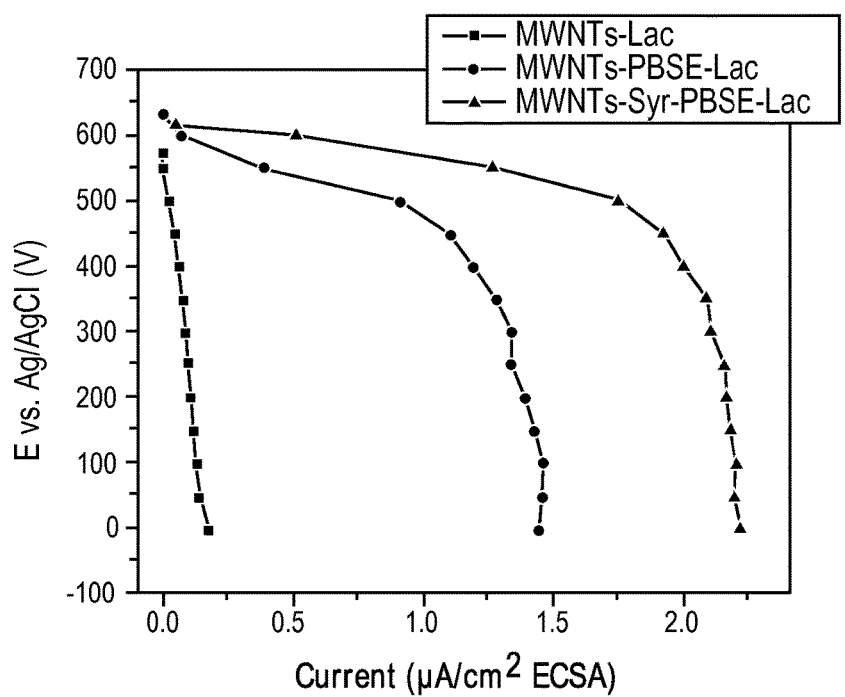
FIG. 43 shows polarization curves of the Lac/MWNTs composites normalized to the electrode electrochemical accessible surface area (ECSA).

When the current densities, generated during the potentiostatic polarization curves, were compared it was established that the current densities, normalized to the geometrical surface area or the electrochemical accessible surface area, are significantly higher in the whole potential region (FIGS. 42, 43). The fact that the current generated during the electrode polarization at high potentials is significantly higher in the presence of an orienting agent confirms that this agent is responsible for the observed increase and that this increase is due to the specific enzyme orientation. The current density generated at 0.3 V from the electrode containing only Lac is 5.7 µA/cm2 (GSA), the current density when the enzyme is tethered with PBSE is 144 µA/cm2 (GSA) and the current density in presence of orienting agent (syringaldazine) is 320 µA/cm2 (GSA).

Figure 44:
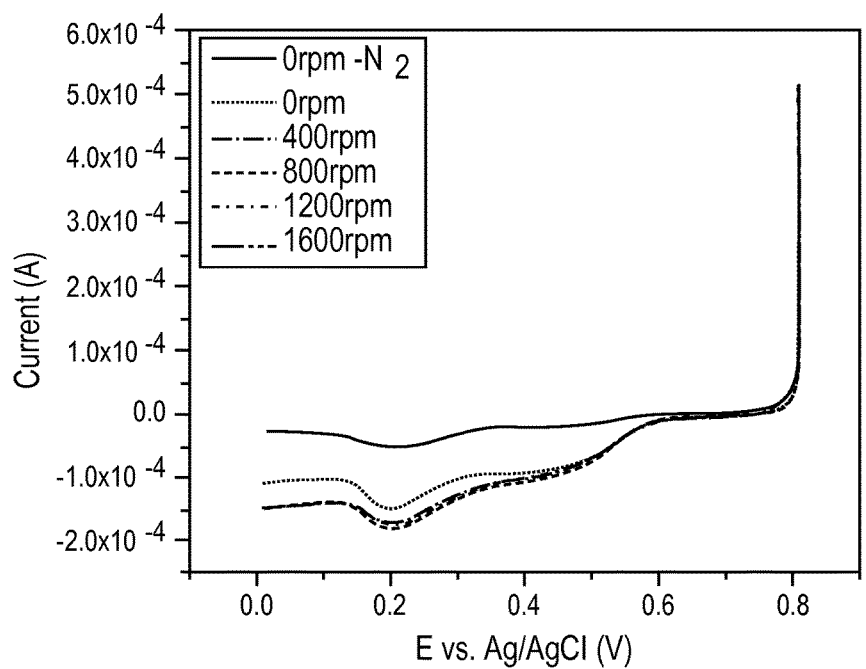
FIG. 44 shows RDE tests of MWNTs-Syr-PBSE-Lac electrode in anaerobic and aerobic conditions with different rotating speeds.

It was also proven that the electrochemical response is observed because of the reduction of oxygen (FIG. 44). In absence of oxygen the recorded current at 400 mV is substantially lower than in presence of oxygen. The current of the reduction peak of syringaldazine reduction is approximately the same in presence and absence of oxygen, but the catalytic wave due to enzymatic reaction is increasing when the system is supplied with oxygen.

The concept of using the enzyme's natural substrate as an orienting agent in combination with a linker for efficient enzyme orientation and stronger attachment to the carbon nanotubes (electrode material) was proved again with the utilization of laccase and its natural substrate syringaldazine. All observations made with bilirubin oxidase was confirmed with another multi-copped oxidase-laccase.

As an alternative to PBSE, we explored the integration of DDPBSE (4,4'-[8,16-Dihydro-8,16-dioxo-dibenzo[a,j]perylene-2,10-diyl)dioxy]dibutyric acid di(N-succinimidyl ester). DDPBSE have the same defined aromatic functionality for specific π-π stacking interactions with MWCNTs. The two additional protein binding "spacer arms" of DDPSE should also provide a more controlled and sterically fixed binding of an enzyme.

It is known that bilirubin oxidase similarly to laccase can oxidase several organic compounds, such as catechol (Cat.) and syringaldazine (Syr.). To further expand the number of orienting agents we tested the possibility of exploring catechol and syringaldazine for BOx orientation.

Three different enzyme-carbon nanotubes composites were studied. The first composite (MWNTs-DDPBSE-BOx) is consistent of 1% multi-wall nanotubes (MWNTs) with 0.1% TBAB-Nafion, suspended in water:ethanol (4:1) mixture. The MWNTs suspension is than sonicated for 30 min for nanotubes dispersion. DDPBSE and bilirubin oxidase were added to the MWNTs and led to adsorb overnight. The rest of the compositions (MWNTs-Cat-PBSE-BOx, MWNTs-Syr-PBSE-BOx) 10 mM catechol and 10 mM syringaldazine were used as orienting agent. The orienting agent was added before the enzyme and adsorbed onto MWNTs surface for an hour. 10 mM PBSE with 10 mM BOx were added and led to adsorb overnight.

10 µl from each enzyme/nanocomposite suspension were dropped onto the surface of Rotating disk electrode and dried. The electrode operation was tested in three-electrode electrochemical cell in 0.1 M phosphate buffer, pH 6. Pt-wire was used as counter electrode and 3M Ag/AgCl was applied as reference electrode. Linear and cyclic voltammetry were carried out as well as potentiostaic polarization curves.

Figure 45:
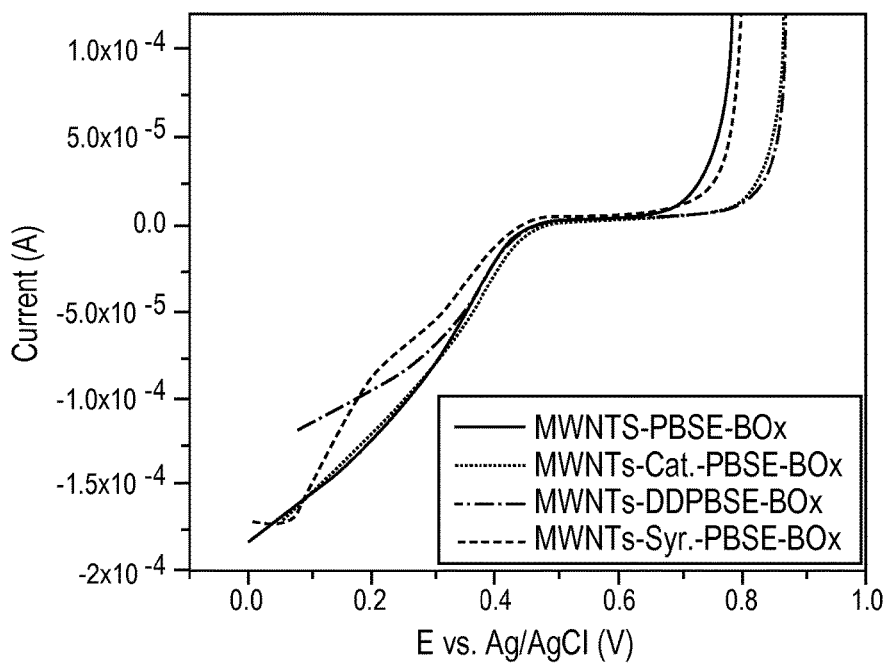
FIG. 45 shows Rotating Disk Electrode measurements of the five BOx/MWNTs composites: catechol-PBSE-BOx, DDPBSE-Box and syringaldazine-PBSE-BOx, 1600 rpm, 10 mV/s. Not normalized.
Figure 46:
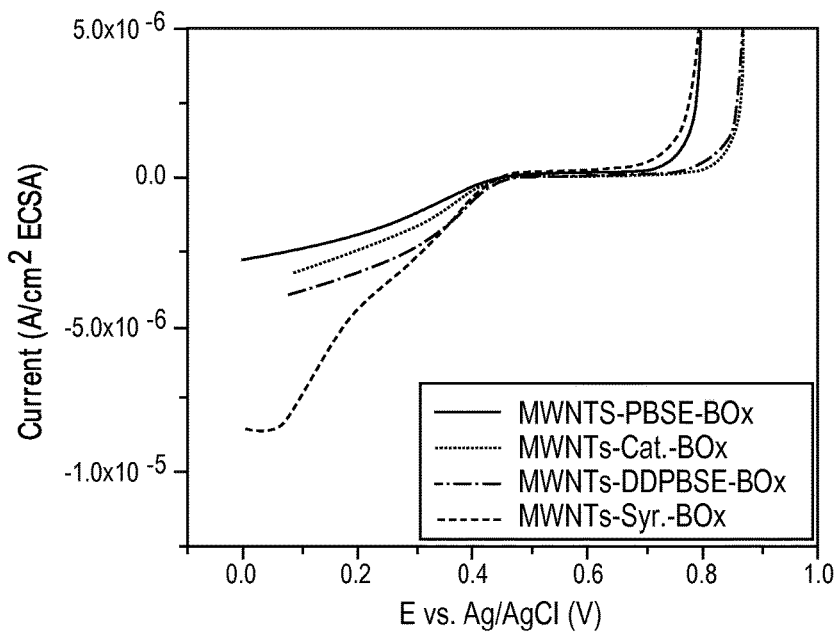
FIG. 46 shows Rotating Disk Electrode measurements of the five BOx/MWNTs composites: catechol-PBSE-BOx, DDPBSE-Box and syringaldazine-PBSE-BOx, 1600 rpm, 10 mV/s. Normalized to the ECSA.
Figure 47:
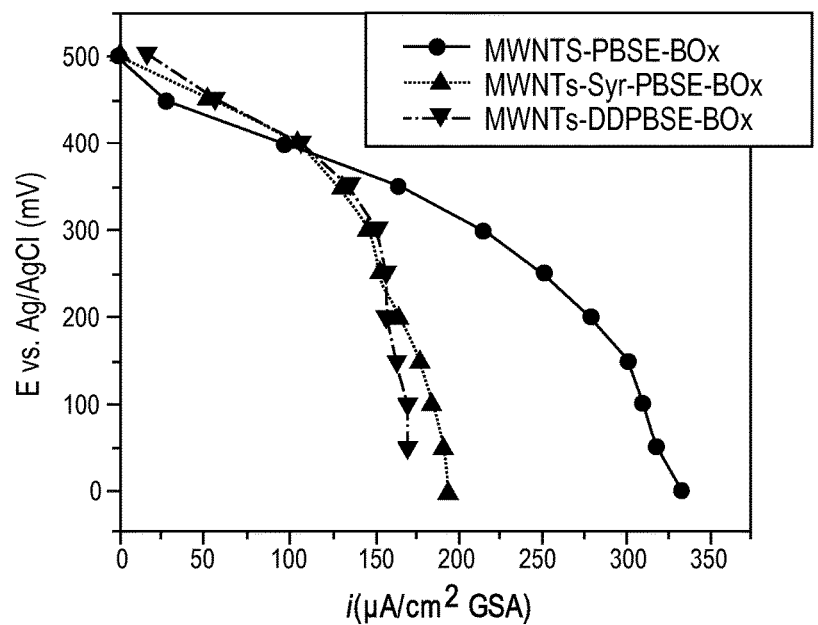
FIG. 47 shows potentiostatic polarization curves of the BOx/MWNTs composites: DDPBSE-BOx, syringaldazine-PBSE-BOx. Normalized to the geometrical surface area.
Figure 48:
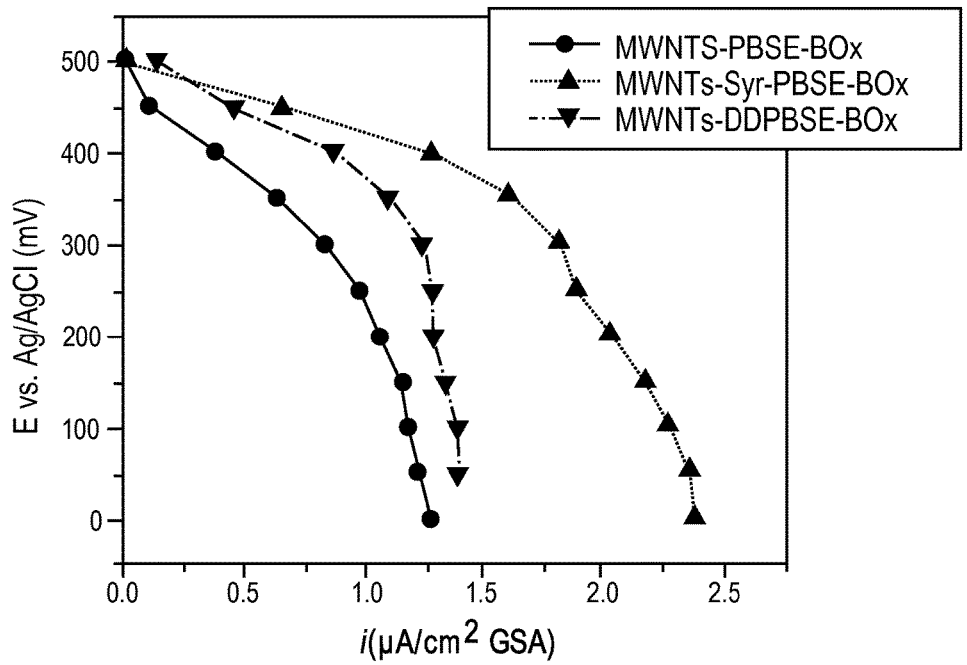
FIG. 48 shows potentiostatic polarization curves of the BOx/MWNTs composites: DDPBSE-BOx, syringaldazine-PBSE-BOx. Normalized to ECSA.

FIGS. 45 and 46 shows the LVs of the tested electrodes. For comparison the LV of MWNTs-PBSE-BOx is also plotted. It can be seen that the limiting current observed with DDPSE used as a linker is lower in comparison with BOx immobilized with PBSE. We know that the electrode behavior is determined by the amount and the orientation of the enzyme. The currents generated at high potentials are identical with both of the tethering agents, which indicate that the enzyme is oriented with the same efficiency in both cases and the difference in performance should be due to the enzyme amount attached on the surface of the nanotubes. When polarization curves where taken (FIGS. 47 and 48) with the same electrodes it was established that the current normalized to the ECSA of the electrodes with DDPBSE are even higher than the current densities generated in presence of PBSE. Therefore the higher currents observed in presence of PBSE are due to the higher amount of nanotubes and enzyme. A reason for the contradictory results from the RDE measurements and polarization curves can be the different amount of nanotube/enzyme mixture dropped on the electrode surface. Thus the results should be normalized to the ECSA in order to compare them, eliminating the differences between sample amounts. Normalizing the current to the calculated ECSA for each electrode separately is a way to overcome this problem (FIG. 48). Based on FIG. 48 it is obvious that the current densities generated when DDPBSE is used are higher. Thus the catechola and syringaldazine are orienting the BOx to higher extend than just PBSE as a linker.

The current density at 0.0 V vs. Ag/AgCl with syringaldazine (8.47 µA/cm$^2$ ECSA) are even higher than the current density recorded in presence of bilirubin (5.18 µA/cm$^2$ ECSA). From the polarization curves can be seen that the current densities at the beginning of the polarization, at low overpotentials, are higher with catechol and syringaldazine regardless of the approach used to represent the current densities. This confirms the conclusion that these two substrates can be applied as orienting agents.

The aim of this task is to create air breathing gas diffusional cathode using linker for the enzyme immobilization and orienting agent for efficient electron transfer. The first type of electrodes was developed on the base of oxygen reduction by bilirubin oxidase and bilirubin as orienting agent. Two gas diffusional electrodes were prepared and tested: i) with PBSE as a linker and ii) with bilirubin for sufficient enzyme orientation and PBSE for immobilization. The cathodes have identical design. They consisted of Ni-mesh giving strength of the cathode and providing enough conductivity, 150 mg teflonized carbon black (carbon black Vulcan XC72R and 35% PTFE) as gas diffusional layer and highly conductive multi-walled nanotube paper (Buckeye paper Grade CMN, Buckeye Composites Kettering, Ohio) for the catalytic layer. 50 µL IPA were added before the Buckeye paper. The three layers were pressed together with hydraulic pressure 500 psi for 5 min. The first electrode was modified by the addition of 150 µL 10 mM bilirubin allowed to adsorb for 1 hour, followed by 150 µL 10 mM PBSE again left to adsorb for 1 hour. Bilirubin oxidase (10 mg) was dissolved in 300 µL phosphate buffer and ket in the fridge for 24 hours. The second electrode was constructed the same way without the addition of bilirubin.

Figure 49:
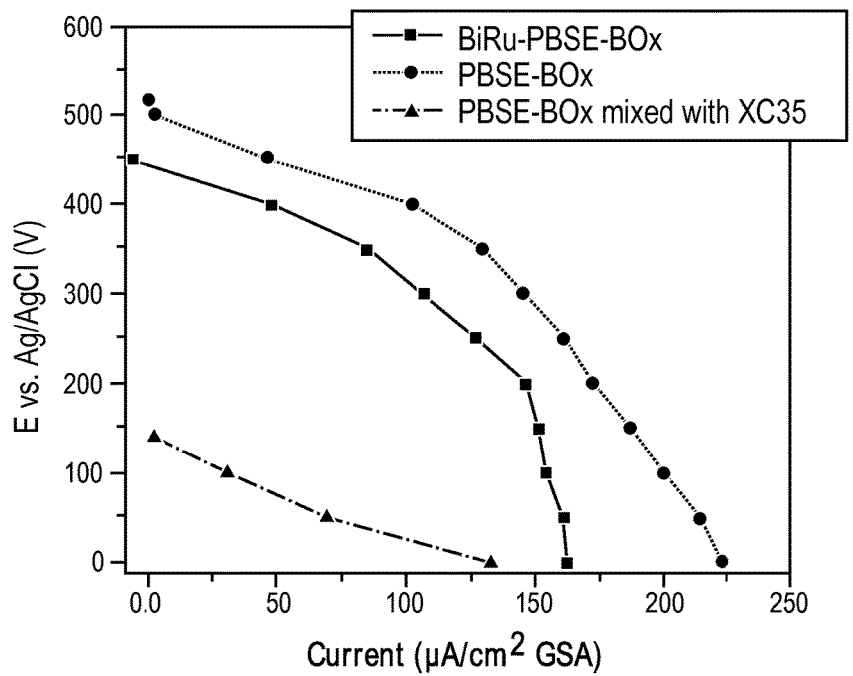
FIG. 49 shows potentiostatic polarization curves of gas-diffusion cathodes modified with PBSE as a tethering and bilirubin as orienting agents for the immobilized bilirubin oxidase.

Potentiostatic polarization curves were taken in air breathing mode in a plastic cell, volume 2 mL, with open end for the cathode. Pt mesh was used as a counter electrode and 3M Ag/AgCl as reference electrode. The results are shown in FIG. 49 and were compared with cathode prepared by mixing the solution PBSE and BOx with 150 mg XC35, than pressed. The current densities generated from the cathode utilizing bilirubin are higher at all applied potentials. Definitely, this is due to the more effective orientation of the enzyme towards the nanotube paper.

What is claimed is:

1. An electrode comprising a catalytic enzyme tethering agent and a catalytic enzyme orienting agent presented on the electrode surface wherein the orienting agent is selected from the group consisting of: 1H-Pyrrole-1-propionic acid, Pyrrole-2-carboxaldehyde, 2,5-Dimethyl-1-phenyl-1H-pyrrole-3-carbaldehyde, 5,5'-(2,3,4,4a,5,6-hexahydronaphthalene-2,7-diyl)bis(1h-pyrrole-2-carbaldehyde), and Tetraethyl 1,1'-(1,4-phenylene)bis(2,5-dimethyl-1h-pyrrole-3,4-dicarboxylate).

2. The electrode of claim 1 wherein the electrode is a cathode.

3. The electrode of claim 1 further comprising a catalytic enzyme tethered to the surface via the tethering agent and oriented via the orienting agent.

4. The electrode of claim 3 wherein the catalytic enzyme is selected from the group consisting of pyrroloquinoline quinone (PQQ)-dependent enzymes and multi-copper oxidases (MCOs).

5. The electrode of claim 4 wherein the electrode is a cathode and the catalytic enzyme is an MCO.

6. The electrode of claim 5 wherein the MCO is bilirubin oxidase.

7. The electrode of claim 1 wherein the orienting agent is 1H-Pyrrole-1-propionic acid.

8. The electrode of claim 1 wherein the orienting agent is Pyrrole-2-carboxaldehyde.

9. The electrode of claim 1 wherein the orienting agent is 5,5'-(2,3,4,4a,5,6-hexahydronaphthalene-2,7-diyl)bis(1h-pyrrole-2-carbaldehyde).

10. The electrode of claim 1 wherein the orienting agent is Tetraethyl 1,1'-(1,4-phenylene)bis(2,5-dimethyl-1h-pyrrole-3,4-dicarboxylate).

11. The electrode of claim 1 wherein the orienting agent is 2,5-Dimethyl-1-phenyl-1H-pyrrole-3-carbaldehyde.

12. A biofuel cell comprising:
an anode comprising a support having a surface, wherein the surface presents:
a catalytic enzyme tethering agent; and
a catalytic enzyme orienting agent;
a cathode comprising a support having a surface, wherein the surface presents:
a catalytic enzyme tethering agent; and
a catalytic enzyme orienting agent selected from the group consisting of: 1H-Pyrrole-1-propionic acid, Pyrrole-2-carboxaldehyde, 2,5-Dimethyl-1-phenyl-1H-pyrrole-3-carbaldehyde, 5,5'-(2,3,4,4a,5,6-hexahydronaphthalene-2,7-diyl)bis(1h-pyrrole-2-carbaldehyde), and Tetraethyl 1,1'-(1,4-phenylene)bis(2,5-dimethyl-1h-pyrrole-3,4-dicarboxylate).

13. The biofuel cell of claim 12 wherein the anode further comprises a catalytic enzyme immobilized to the anode support and oriented by the orienting agent.

14. The biofuel cell of claim 12 wherein the cathode further comprises a catalytic enzyme immobilized to the anode support and oriented by the orienting agent.

15. The biofuel cell of claim 12 wherein the orienting agent in the cathode is 1H-Pyrrole-1-propionic acid.

16. The biofuel cell of claim 12 wherein the orienting agent in the cathode is Pyrrole-2-carboxaldehyde.

17. The biofuel cell of claim 12 wherein the orienting agent in the cathode is 5,5'-(2,3,4,4a,5,6-hexahydronaphthalene-2,7-diyl)bis(1 h-pyrrole-2-carbaldehyde).

18. The biofuel cell of claim 12 wherein the orienting agent in the cathode is Tetraethyl 1,1'-(1,4-phenylene)bis(2,5-dimethyl-1h-pyrrole-3,4-dicarboxylate).

19. The biofuel cell of claim 12 wherein the orienting agent is 2,5-Dimethyl-1-phenyl-1H-pyrrole-3-carbaldehyde.

* * * * *